United States Patent [19]

Livingston

[11] Patent Number: 5,694,450
[45] Date of Patent: *Dec. 2, 1997

[54] SYSTEM FOR MARKING PRINTED DATA ON X-RAY FILM

[75] Inventor: Troy W. Livingston, Northbrook, Ill.

[73] Assignee: Livingston Products, Inc., Wheeling, Ill.

[*] Notice: The term of this patent shall not extend beyond the expiration date of Pat. No. 5,416,823.

[21] Appl. No.: 409,765

[22] Filed: Mar. 23, 1995

Related U.S. Application Data

[63] Continuation-in-part of Ser. No. 158,602, Nov. 24, 1993, Pat. No. 5,416,823, which is a continuation-in-part of Ser. No. 68,059, May 27, 1993, abandoned.

[51] Int. Cl.⁶ .................................................. H05G 1/28
[52] U.S. Cl. ........................................ 378/166; 378/165
[58] Field of Search ................................. 378/165, 166

[56] References Cited

U.S. PATENT DOCUMENTS

| | | | |
|---|---|---|---|
| 4,001,592 | 1/1977 | Katz et al. | 378/166 |
| 5,034,974 | 7/1991 | Yurosko | 378/166 |
| 5,381,457 | 1/1995 | Burns | 378/166 |
| 5,416,823 | 5/1995 | Livingston | 378/166 |

*Primary Examiner*—Don Wong
*Attorney, Agent, or Firm*—Fitch, Even, Tabin & Flannery

[57] ABSTRACT

An X-ray film marking unit for exposing a portion of the film with a label having indicia relating to patient identifying and X-ray machine identifying information. A computer or microprocessor system is fully integrated as part of a smart marking system which may retrieve data from various sources via digital interface ports. Three modes of operation, full-automatic, semi-automatic and stand-alone, are utilized for data retrieval.

5 Claims, 27 Drawing Sheets

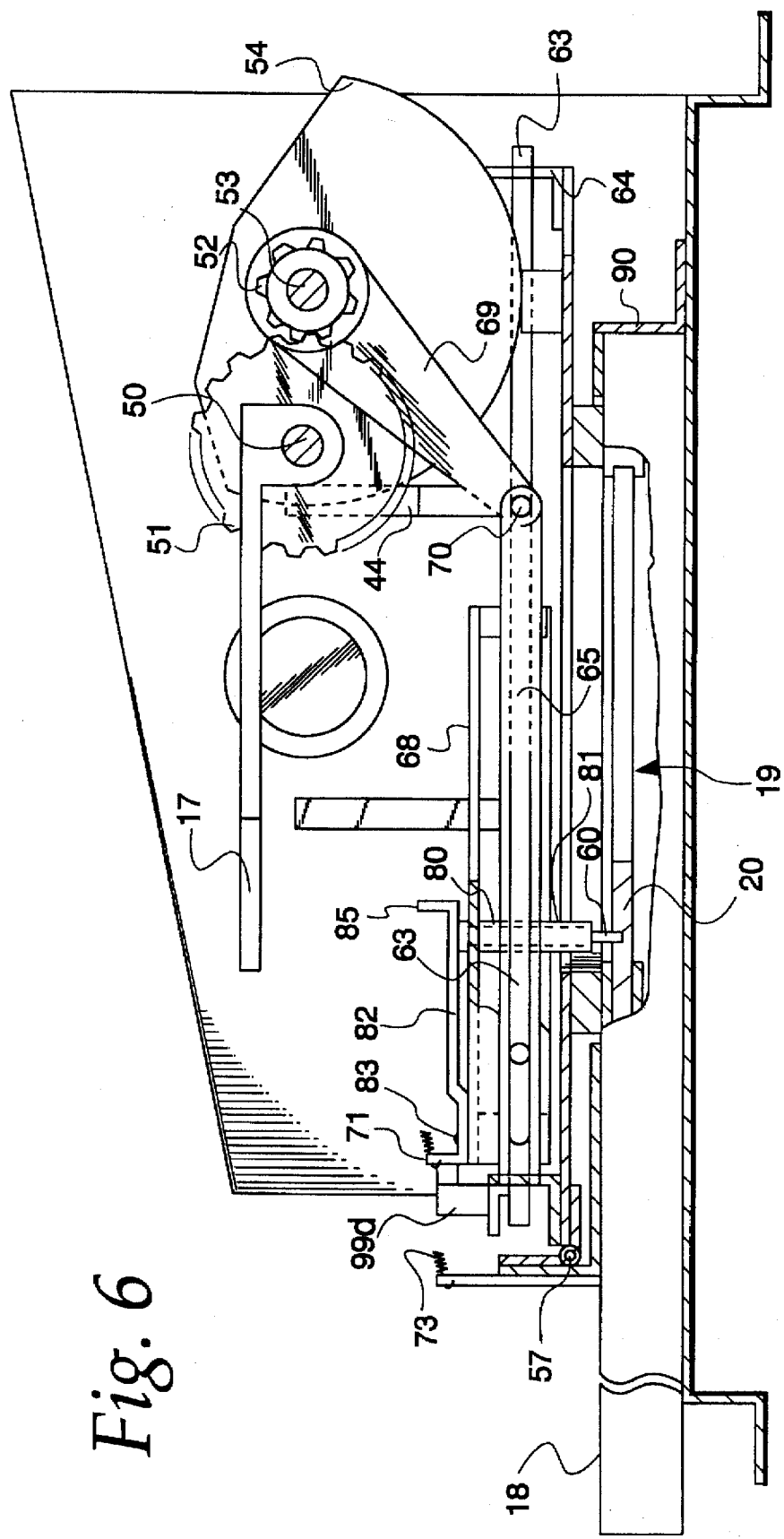

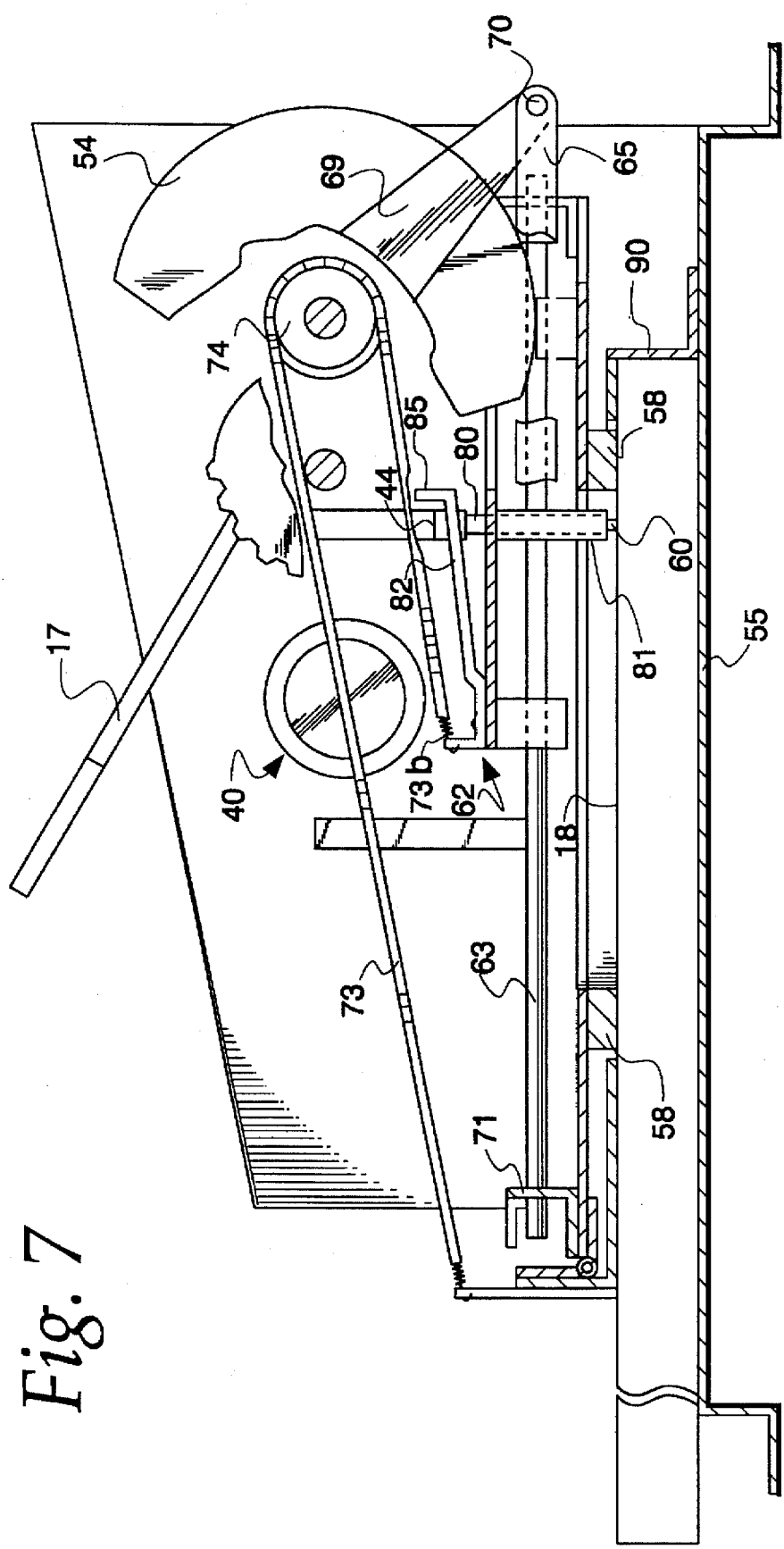

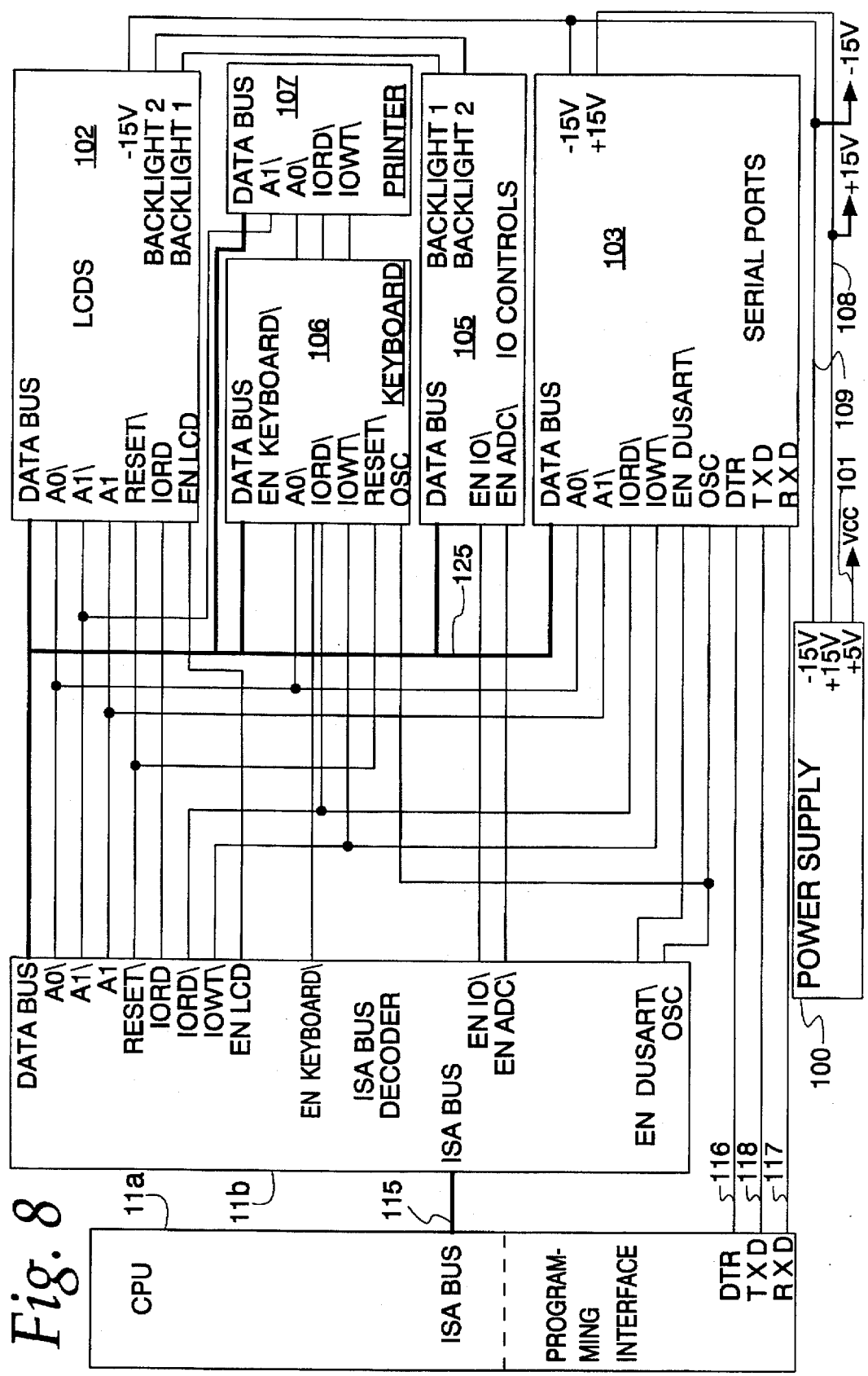

| Fig. 10A | Fig. 10B |
|---|---|
| Fig. 10C | Fig.10 D |

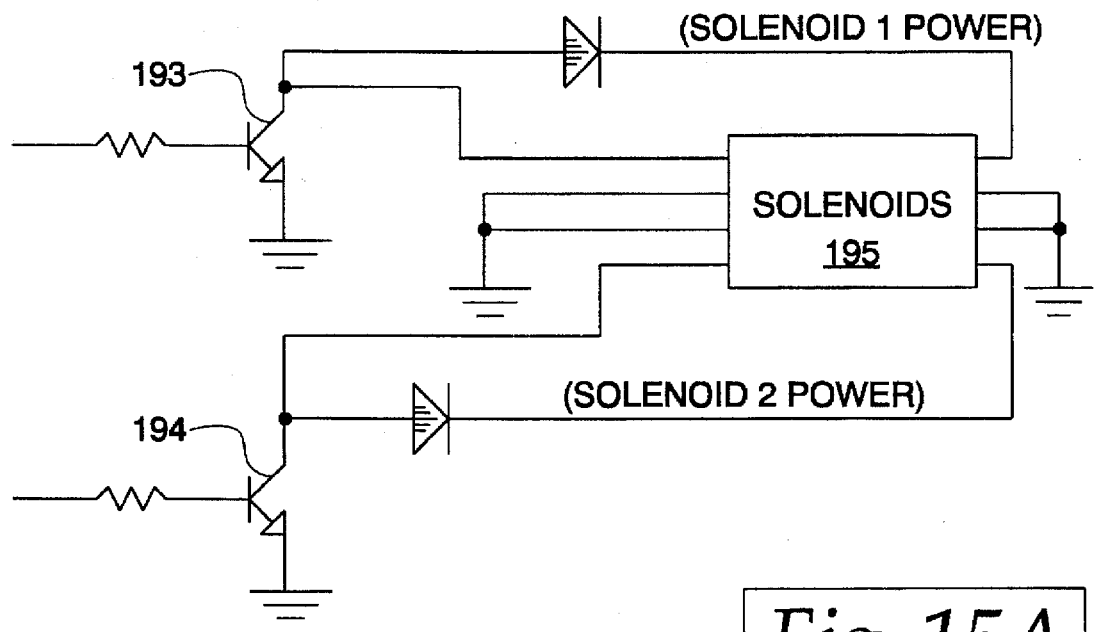
*Fig. 15A*
*Fig. 15B*
*Fig. 15*
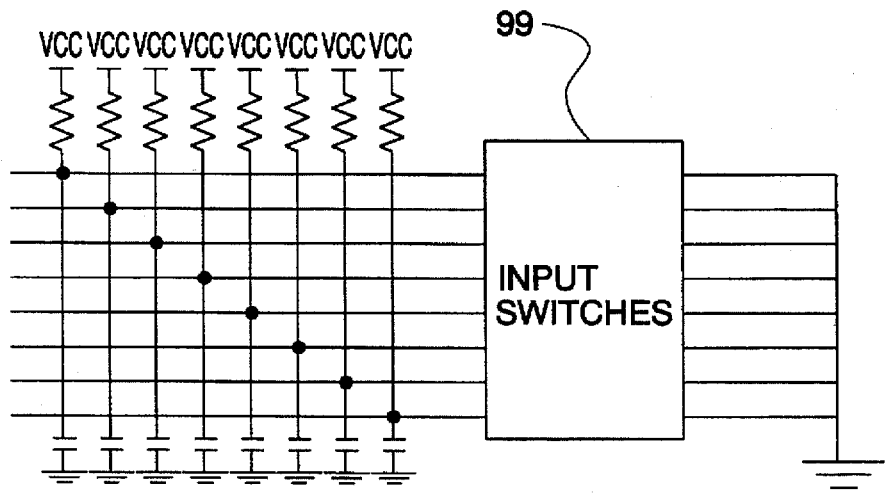
*Fig. 15B*

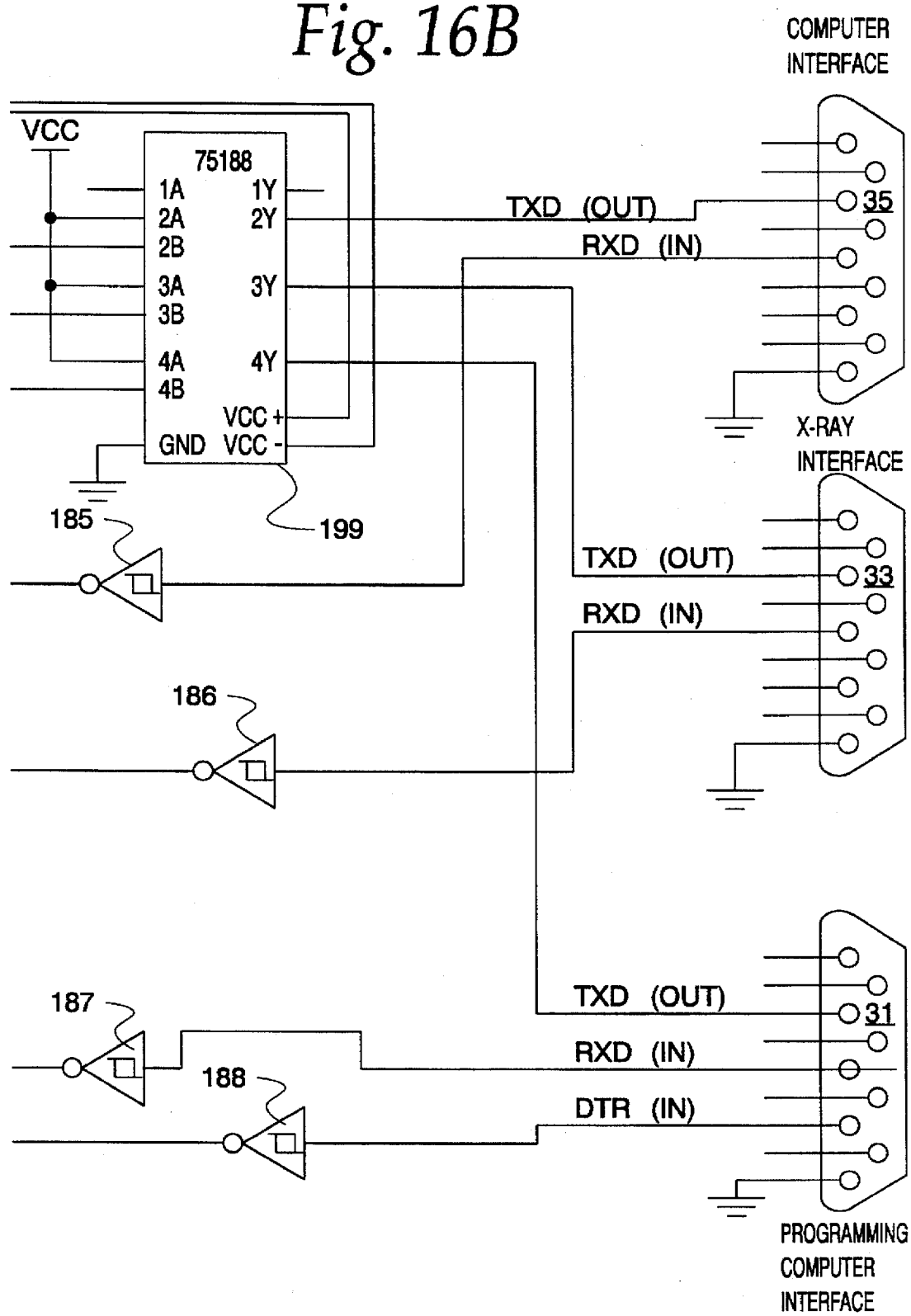

SYSTEM FOR MARKING PRINTED DATA ON X-RAY FILM

CROSS-REFERENCE TO RELATED APPLICATION

This is a continuation-in-part of U.S. application Ser. No. 08/158,602, filed Nov. 24, 1993, now U.S. Pat. No. 5,416,823, which is a continuation-in-part of U.S. application Ser. No. 08/068,059 filed May 27, 1993, now abandoned.

BACKGROUND OF THE INVENTION

This invention relates to a method of and an apparatus for printing patient information on an X-ray film carried in an X-ray cassette. More particularly, the invention relates to computer controlled systems for collecting and printing patient identifying and X-ray machine identifying information on X-ray film and storing the same for archival purposes and to ensure the integrity of such information.

Many X-rays, such as mammographic X-rays of breasts, are performed on an X-ray machine that uses an X-ray film holder called a cassette that slides into and out of a support on the X-ray machine. The typical cassette is a rectangular flat package that is hinged at one end to open to allow access to an internal foam pad on which is laid an X-ray film sheet that will receive the X-ray image. Currently, most such cassettes also have a narrow window slide in one corner of the cassette that is slid open to expose the film for printing patient data through the window onto the film.

Typically, the patient data of interest includes identity, time and location information and the X-ray machine data of interest includes the type of view, the operating parameters and other information relating to the X-ray machine. For a mammogram X-ray, it may be desired to set forth in four to six rows of information: the clinic name, date, time, patient name and identification number, exposure number, voltage used, exposure time, mode, technique used, angle of C-arm, breast thickness, compression force, filter and dosage. The letters to be printed are about newspaper size lettering; and the letters need to be nice, crisp and clear. The letters are white on an exposed, black background and may have to be printed in a space that is only 0.5 inch in height and 2.5 inches in length.

Currently, X-ray film is being marked by systems in which the information is furnished on data carrier cards and liquid crystal displays (LCDs) which are illuminated to project the information onto the film. Such systems have been designed to use data carrier cards or liquid crystal displays or some combination thereof.

A system employing data carrier cards provides a label printed with the desired information and attached to an IBM perforation card which is placed into an exposure unit along with the X-ray cassette. An electrically operated finger slides the cassette window slide to an open position to provide the window through which light is flashed to expose the letters on the film. The slide is then closed and the cassette is removed from the exposure unit, as is the IBM card bearing the information label thereon.

Since it sometimes occurs that cassettes and IBM cards are inadvertently mixed such that the film is marked with incorrect information, it has been found desirable to provide an indication of precise date and time information with the exposure. Previously, a timer disk driven by a motor has been mounted adjacent the data carrier card to project such information. However, such timer disks are bulky and the information provided thereby is often highly inaccurately and cannot be readily deciphered by a physician. To this end, U. S. Pat. No. 4,383,329 to Kröbel et al. entitled "Apparatus for Recording Data on X-ray Films or the Like," issued May 10, 1983, proposed providing a liquid crystal-type digital clock display including a digital calendar and counter adapted for use in an exposure unit to mark film with such information. By proposing both a data carrier card and a liquid crystal display, Kröbel et al. would provide marking of patient and X-ray machine identification information, along with time information. The separate act of providing a label with the desired information and attaching it to an IBM card and then positioning the card in the exposure unit results in a system which is slow and expensive. U. S. Pat. No. 5,136,626 to Ort, entitled "Method for Identifying X-ray Film with Patient Information Displayed Outside a Cassette," issued Aug. 4, 1992, proposed adding a liquid crystal display as an integral component to a cassette to perform the function of the data carrier card. The Ort cassette has a number of control contacts allowing information to be transferred to the display from a data processing unit having a user keyboard for entry of such information.

Today, information which might be found useful for marking on X-ray film is available from a wide variety of data sources. Such sources include computers which might reside in the medical setting, including main frames in personal computers, and also some X-ray machines which provide for a digital interface allowing access to machine data. Prior art exposure units, however, are designed to receive information provided by a human operator, requiring that the operator transcribe all such information, which is tedious and subject to human error. It would be desirable, therefore, to take advantage of the various data sources available by retrieving data directly from the source, whether it be an interface computer, an X-ray machine or both. Thus, there exists a need for a new and improved system for marking patient and X-ray machine identifying information on X-ray films in cassettes.

Preferably, an improved marking system should include an exposure unit which is easy to use, both as a stand-alone unit and with remote apparatus interfaced thereto. It would therefore be further desirable to provide a "smart" marking system which itself includes a computer or microprocessor, facilitating efficient retrieval of information from the various data sources. Rather than merely receiving information, a smart marking system could directly retrieve information from data sources. As such, a smart marking system might include various interface ports, allowing the system to interrogate for the presence or absence of information sought for marking. Establishing a hierarchy of data sources as inputs would allow for the automatic and/or semi-automatic operation of the smart system to optionally look for patient and X-ray machine information from the computer interface, the X-ray machine interface or the user keyboard in the absence of data from computer or machine interfaces.

Under new regulations, the X-ray data and the patient identification data must be printed on the X-ray film prior to removal of the X-ray film from the cassette. A large number of mammography and chest X-ray machines exist today and are in use without having any way of printing such information on the X-ray film. The present invention is directed to solving this problem by providing a stand-alone apparatus that can be used, for example, in a clinic in connection with one or several mammography machines that have no computer output capability. In order to be effective, the flasher apparatus has to be low-cost in comparison to the mammography machines which typically cost about $60,000 to $80,000. Preferably, the flasher apparatus should cost less than a tenth of this cost range. In addition to being cost effective, the flasher apparatus must be relatively foolproof; and yet, simple to operate, and fast in operation. That is, the apparatus should check that cassette is properly positioned and that window slide is fully opened before a flashing operation is done. Also, to prevent a repeated erroneous operation, it is desired that the flasher flash patient information only once and not be capable of repeating an erroneous flash of a patient's data onto a succeeding cassette of another, subsequent patient. The preferred apparatus should be capable of operating the three modes of manual only; semi-automatic with some information coming from a remote computer such as patient data from a hospital main frame and X-ray parameter data generated by the keyboard; and fully automatic with all of the information coming from a computer associated with the mammography machine.

SUMMARY OF THE INVENTION

In accordance with the present invention there is provided a stand-alone flasher apparatus exposing and printing on an X-ray film in a cassette the patient and X-ray machine identifying information. The stand-alone unit may be placed next to one or more mammography machines; and, after an X-ray exposure, the cassette may be removed from the mammography machine and placed in the adjacent flasher unit. The patient and X-ray data may be typed on a keyboard of the flasher apparatus and in a short period of time, e.g., three seconds, the typed information is flashed onto the film. There may be as much as four lines of sixty characters per line flashed onto the X-ray film. The apparatus is relatively inexpensive so that it can be purchased for use with existing mammography X-ray machines. Also, the apparatus may be used in semi-automatic or automatic modes. The optical character generator and projector is operable by electronic data signals from interface ports retrieving such signals from a remote apparatus such as an X-ray machine and input data means, such as typewriter keyboard and/or stored signals from a computer. Thus, it is electrical signals that are retrieved directly from data sources to operate the optical character generator and projector which may comprise a plurality of liquid crystal displays (LCD's) that are back lit. A lens system is used for focusing the print image onto the X-ray film for a predetermined period of time which may be controlled by a shutter or the like, or by inhibiting the back light.

The preferred system also includes a microprocessor or computer which can control the electrical operation of actuators to open and close the window slide on the cassette and control the time of exposure and operation of the LCD's. The microprocessor may also have stored data therein such as the name of the clinic and generate data such as time and date which operates the LCD's to display this data. The electrical signals to operate the optical character generator and projector also may come from remote locations such as a bar code reader, a magnetic tape reader or over a cable from an X-ray machine or another remote apparatus such as a main computer for the clinic or hospital.

In the preferred and illustrated system, the operator slides a cassette into position in the marker unit and a lever is operated for mechanically locking the X-ray film cassette in place, opening the cassette window and notifying that the film is ready for exposure. Once the lever is activated, it is not possible to remove the cassette from the system until the lever is deactivated.

The marking system first looks for patient identifying information through data interface ports which may retrieve such information from remote computer and/or X-ray machine apparatus. If patient identifying information is available through the data interface ports, then it is retrieved thereby for exposure. Otherwise, the required patient identifying information is sought through the user keyboard by the system which prompts a human operator. Second, the system looks for X-ray machine identifying information through the data interface ports. If such information is also available thereby, then it is retrieved for exposure. If X-ray machine data is unavailable through the data interface ports, then again the human operator is prompted for entry of such information via the keyboard. In this context, the "full-automatic mode" of operation of the smart marking system contemplates retrieval of both patient and X-ray machine identifying information through the data interface ports without human interaction. "Semi-automatic mode" on the other hand, is when either patient or X-ray information is retrieved via remote apparatus and remaining required information is retrieved via the human operator. When all such information (both patient and X-ray) is obtained by prompting a human operator, then the system's operation is referred to as "stand-alone mode." For a given location, however, even in stand-alone mode, clinic name, date, time, etc. are read from the memory and the system clock of the microprocessor or computer which controls, and is incorporated within, the smart marking system. Also, it is often desirable to include sequential indicia for quality control, and film density for X-ray machine calibration.

An external user display is provided to indicate the status of the marking system, e.g., whether exposure is complete, system errors, etc. In the stand-alone mode of operation, this display is particularly useful for data entry by the user typist. The display facilitates a man-machine interface by prompting for user input and allows some limited editing by the user prior to exposure.

When the typist and/or other data input means has the appropriate data inputted to the LCD's to produce the print image, the operator causes the printing to begin and then the print image which is sent through a lens system and through the window to expose the film. Preferably, a back light is flashed on and then off for the exposure time. The exposure time when using LCDs may be about one-third of a second which is a long exposure time compared to photographic camera exposure times. Exposure time also varies with film density and the intensity of the back light, thus a light sensor or photo diode may be advantageously employed to vary the exposure time with light intensity. The marking system of the present invention will not allow a second exposure of an inserted X-ray film cassette.

In the embodiment utilizing the above described lever, the film cassette is removed after the lever is deactivated, as previously described. START During the printing operation, it is preferred to block the cassette against movement and removal until the printing is completed and this may also be done by a solenoid-operated device.

The utilization of a microprocessor or computer fully integrated into the smart marking system provides additional advantages. Such advantages provided by this integrated system include added security through password protection, long-term storage of data within computer memory, and the ability to connect to a printer to output some or all of the data from exposures performed in a given time frame, e.g., end of day hard copy printouts. The details of the invention together with further advantages are set forth in the detailed description which follows. The precise scope of the invention is defined by the claims annexed to and forming a part of this specification.

BRIEF DESCRIPTION OF THE DRAWINGS

FIG. 6 is a view similar to FIG. 4 with the cassette window slide slid to open the cassette window to receive an image;

FIG. 7 shows a spring for the cassette locking and slide opening mechanism shown in FIG. 4;

FIG. 8 is a block diagram of computer control circuitry of the apparatus shown in FIG. 1;

FIGS. 15A and 15B are schematic diagrams of solenoid control and input switch circuitry of the apparatus shown in FIG. 1;

DETAILED DESCRIPTION OF THE PREFERRED EMBODIMENTS

Figure 1:
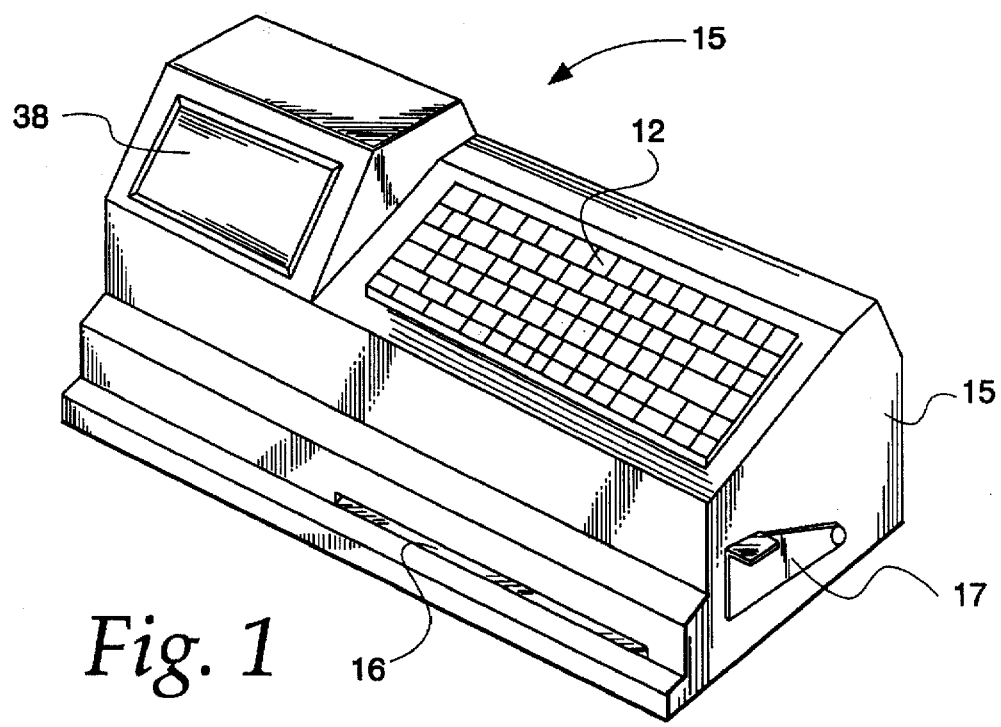
FIG. 1 is a perspective view of apparatus for imprinting or forming a latent image of data on X-ray film in an X-ray cassette having a window.

As shown in the drawings for purposes of illustration, the invention is embodied in a flasher system or apparatus 10 for printing or imprinting data on X-ray film by forming a latent image of the data on the X-ray film that includes a housing 15 (FIG. 1) having a slot 16 into which may be inserted an X-ray cassette 18, having a window 19 which is usually covered by a window slide 20, until it is desired to print on the X-ray film (not shown) inside the X-ray cassette 18. Under new regulations, the information or data concerning the patient and the X-ray parameters is to be printed onto the X-ray film before it is removed from the X-ray cassette 18. It is particularly important that there be proper correlation between the patient data and the actual cassette or else the wrong person's identification may be on two different cassettes. By way of example only, it is preferred to be able to print several lines of data, e.g., four lines of date with a substantial number of characters through a small window that may be only 0.5 inch in height and 2.5 inches in length. Typical data to be printed includes: patient identification information with respect to the location, time, data, place and operating parameters under which the X-ray was taken. The format of the information, the kind of information and the size available may vary; but herein, the printed information in a one-half (½) inch by two and one-half (2.5) inch rectangle in four (4) lines and may read, for example, as follows:

```
Clinic name clinic name 93-03-31 15:35
Patient name and ID Patient name and ID
No99999  28kV 219mAs 2.10s AEC BUCKEY
–45deg 6.5cm 22kg Rh
```

In the first row is the clinic's name followed by the date and time the X-ray was taken. In line 2 above, the patient's name and identification number are printed. In line 3, there is a five-digit exposure number followed by the operating voltage in kV and intensity in mAs (milliampseconds). Also, in line 3 is exposure time of "2.10s" and the exposure mode AEC (which stands for an automatic exposure mode). The last time "Buckey" in line 3, refers to where the cassette was located. For example, on a Buckey plate, or alternatively it may state "Magn" for magnification, or "3-D Bios" for a stereotaxic machine. In line 4, the "45 deg" refers to the C-arm of the X-ray machine being rotated at 45° to the horizontal. The 6.5 cm. refers to thickness of the breast, and the 22 kg refers to the compression force exerted on the breast. "Rh" refers to the filter used. Manifestly, other identifying indicia as may be desired can be used; for instance, the initials of the lab technician or the like.

Figure 2:
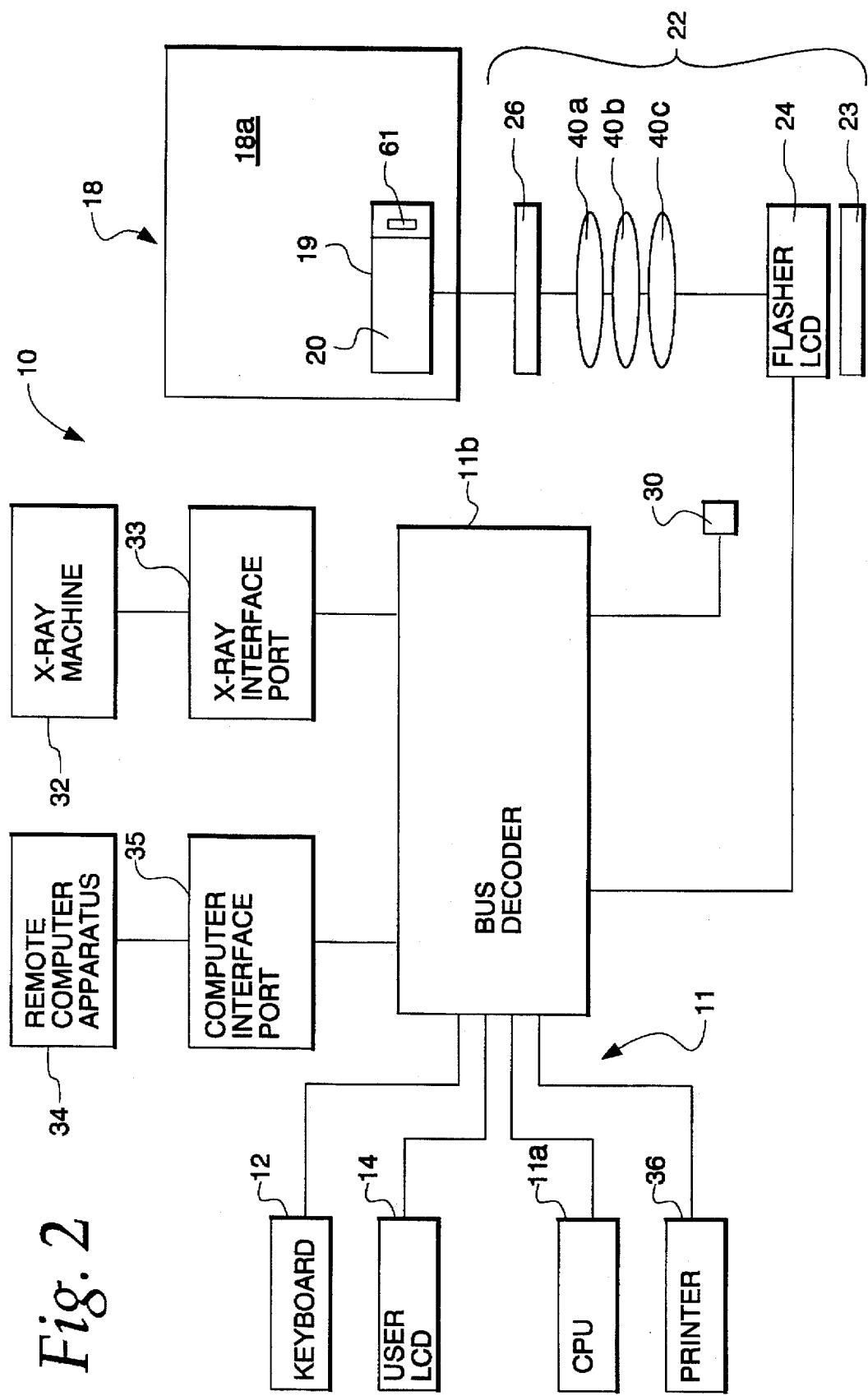
FIG. 2 is a diagrammatic view of the apparatus shown in FIG. 1.

The cassette 18 (FIG. 8) has the window 19 in its top wall 18a which, when the window is uncovered, exposes an X-ray film 18 (FIG. 2) at the window for printing. After printing, the window slide 20 is closed to prevent exposure of the printed lines which are white letters on a black film background. The size of the window defines the maximum size of the printed message or marker that will be on the film. The cassette may be of various kinds such as a standard mammography, panoramic and cephalostat cassette. Different cassettes made by different manufacturers will have their window openings in different positions from that illustrated herein.

In accordance with the present invention, the printed image on the X-ray film is generated and projected onto the film by an optical character generator and projector 22 (FIG. 2) which is operable by electrical signals from a computer or computing means 11. In the preferred embodiment of the invention, the character generator comprises a backlight or bulb 23, which is selectively controlled to illuminate by backlighting a panel 24 of LCD's, which are operated to have the printed data thereon. The image from the LCD's is focused sharply on the film by a lens means 25 and filter 26. The lens means focuses the image onto the film to give crisp, clear and sharp letters; and the filter provides a good contrast so that white letters exposed on the X-ray film can be easily read.

Turning now in greater detail to the illustrated apparatus 10, there is a housing or frame 15 that includes the receiving slot 16 (FIG. 1) for reception of the cassette 18. The illustrated unit or apparatus 10 is small, stand-alone unit that may be placed on a table or mounted on a wall or on an X-ray unit. By way of example only, the housing 15 of the unit may be about 24 cm. in width, 10 cm. in depth, 18 cm. in height and under 4 kg. in weight.

In accordance with the invention, the apparatus 10 may be a stand-alone unit that may be used with various or a number of different X-ray machines rather than being a dedicated apparatus that is incorporated into and is an integral part of a mammography machine that has its own associated computer. To this end, the flasher unit has its own computer 11 (FIG. 2) including a CPU unit 11a and a bus decoder 11b that responds to interlock or input signals indicating that the cassette is in proper position, and that the window slide is open. The computing means 11 cooperates with a keyboard 12, its own internal memory, an X-ray machine 32, or a remote computer apparatus 34 to receive the patient data above-described.

Having this data, the CPU 11a operates the LCD's 24 and the backlighting thereof to generate the data image which is flashed through the lens system 35, filter 26, and through the open window 19 to print onto the film in the cassette. When operating as a stand-alone unit, there will no inputs at the computer interface port 35 or the X-ray interface port 33 for the bus decoder 11b.

In accordance with the present invention, the apparatus has three modes of operation including the stand-alone, i.e., manual operation wherein the computer 11 and keyboard 12 provide the only inputs for character generation. In the stand-alone operation, the apparatus may serve one or several mammography X-ray machines. In another or semiautomatic mode of operation, the remote computer apparatus 34, which may be an institutional hospital main frame computer, provides the patient name, patient identification number to the computer interface port 35 and thereby to the computer 11; and the operator at the keyboard 12 will enter into the computer 11 the parameters with respect to X-ray being taken or recently taken. In the fully automatic mode, the X-ray mammography machine 32 will have its own internal dedicated computer or an attached PC computer that has all of the patient data as well as the X-ray parameter data which it sends through the computer interface port 33 to the computing means 11, which then, operates LCD backlight and LCD's to generate an image of the characters inputted from the remote X-ray machine 33 containing the patient data and X-ray parameter data.

To be cost effective as a stand-alone apparatus, the preferred apparatus 10 was constructed with its own computer or computing means 11 although a more costly, commercially available computer could have been adapted for use herein. Likewise, as will be explained, the apparatus uses a lens system, that is very inexpensive, e.g., a lens system costing $19 for a commercially available, three-element lens and uses an inexpensive yellow celluloid filter 26 to give the sharp image with good contrast to the X-ray film. It is a difficult task to design a printing system having inexpensive components to print clearly four lines having sixty characters per line in a 0.5 by 2.5 inch rectangle an X-ray film. Additionally, a low cost cassette handling mechanism operated by handle, locks the cassette 18 in place and provides a light shield about the window 19 and provides interlocks that assure that the cassette is properly oriented, is located at the proper spot, and that the window slide 20 is fully open before printing commences. More specifically, and in accordance with the present invention, the operator inserts the cassette 18 into the slot 16 to its full depth and a sensor input means 99 (FIG. 8) senses that the cassette is properly inserted and oriented and acts as an interlock to cause the operation to be stopped if the cassette is not properly positioned. After insertion of the cassette, the operator pulls the handle 17 to lock the cassette against removal during the flashing operation and to shift the window slide 20 to its open position. A light trap means about the window prevents ambient light from entering through the open window. Another input sensor 99d senses that the full stroke of the window slide 19 was attained by movement of the handle 17, and enables a printing operation. Preferably, the locking of the cassette against removal, the applying of the light seal, the pulling open of the slide, and the sensing of a fully open slide are accomplished by a simple hand-operated mechanism operable without the use of motors or the like to provide a low cost mechanism to perform these functions.

Turning now to a more detailed description of the housing 15 forming a portion of the apparatus 10, the housing 15 contains a motherboard on which are mounted the computer 11 and the interface ports 33 and 35. A visual display 38 (FIG. 1) which is preferably an array of LCD's are provided on the housing above the keyboard for viewing of the data that is to be inputted and printed onto the X-ray film. As the operator operates the keyboard, the characters being typed by the operator are displayed on the optical display 38. Also, commands or other menu information from the computer 11 will be displayed on the optical display 38 in the usual manner. Preferably, operation of the handle 17 and a proper opening of the window slide 20 results in the switch 99d closing and a message appears on the visual display that the printing operation is commenced. On the other hand, if the window is not fully opened, the switch 99d will be open and a suitable non-print command will be displayed on the visual display to the operator. The keyboard 12 has several control keys, e.g., keys that control printing and select the different modes of operation. The housing 15 may be, for example, as small as 24 cm. in width, 10 cm. in depth, 18 cm. in height and 4 kg. or less in weight.

Figure 5:
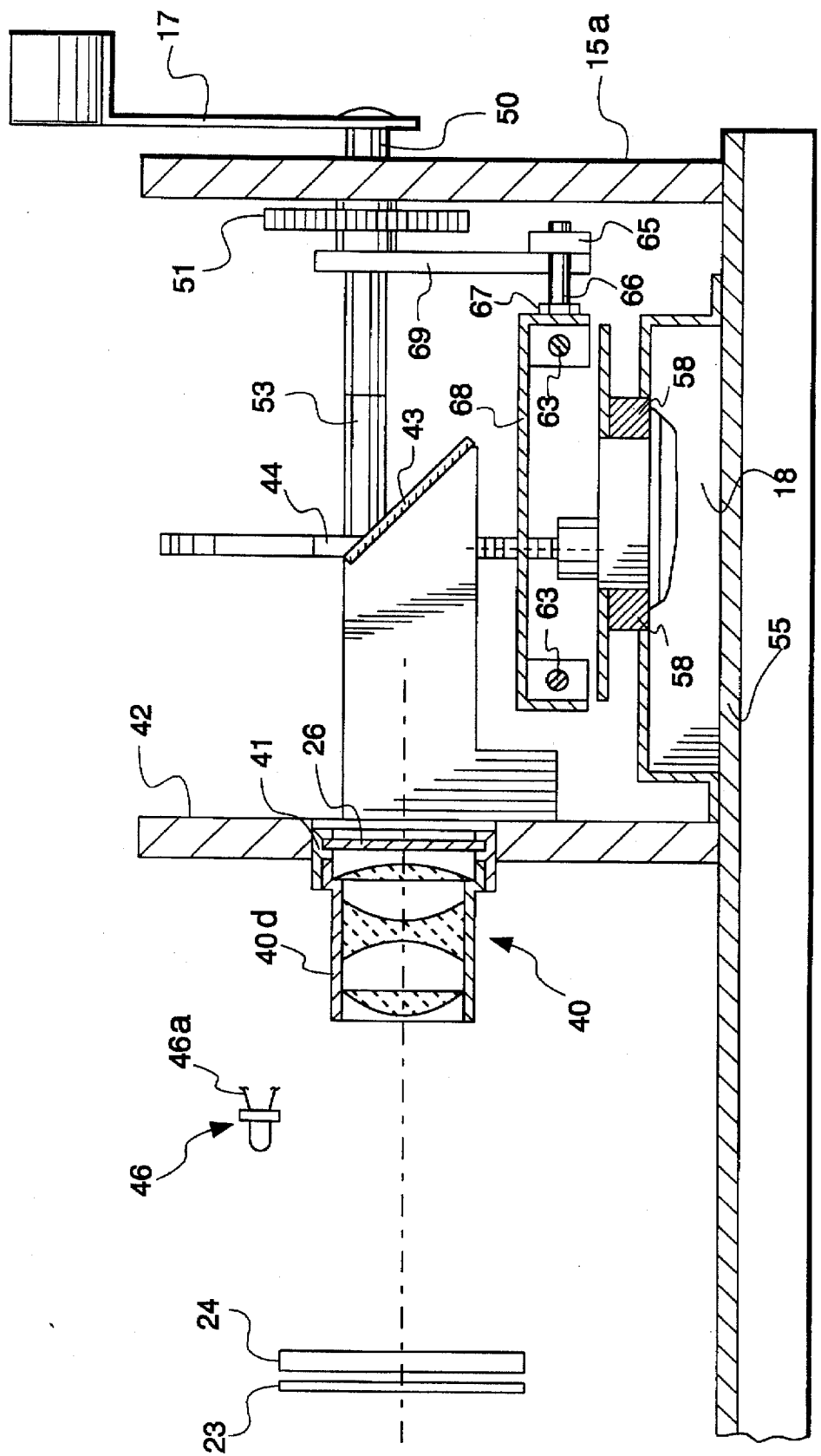
FIG. 5 is a partial cross-sectional view of the apparatus shown in FIG. 1 showing details of a lens system and slide carrier.

The slot 16 is preferably sufficiently wide to receive both the usual cassette used for mammography and a larger cassette used for chest X-rays. Mounted horizontally within the housing is the optical character generator and projector 22 (FIG. 5) that includes, in sequence from left to right in the housing, a backlight 23 that is connected to the computing means 11 and is electronically controlled to cause illumination of the flasher LCD's 24 which are adjacent thereto. Herein, the preferred code is an Epson printing code of electronic data signals from the computing means that operates the LCD panel 24 for printing. The preferred, inexpensive and small LCD panel for flashing is available from Hitachi Corporation and sold under the name of Graphic Alpha Numerical EL Backlighting Part No. LMG6381QHGE. The external display 38 has another LCD unit sold by Hitachi Corporation and sold under the name of Graphic Alpha Numerical EL Backlighting Part No. LMG6401PLGE.

Manifestly, other character generators than LCD's could be used and other brands of LCD's may be used.

Figure 3:
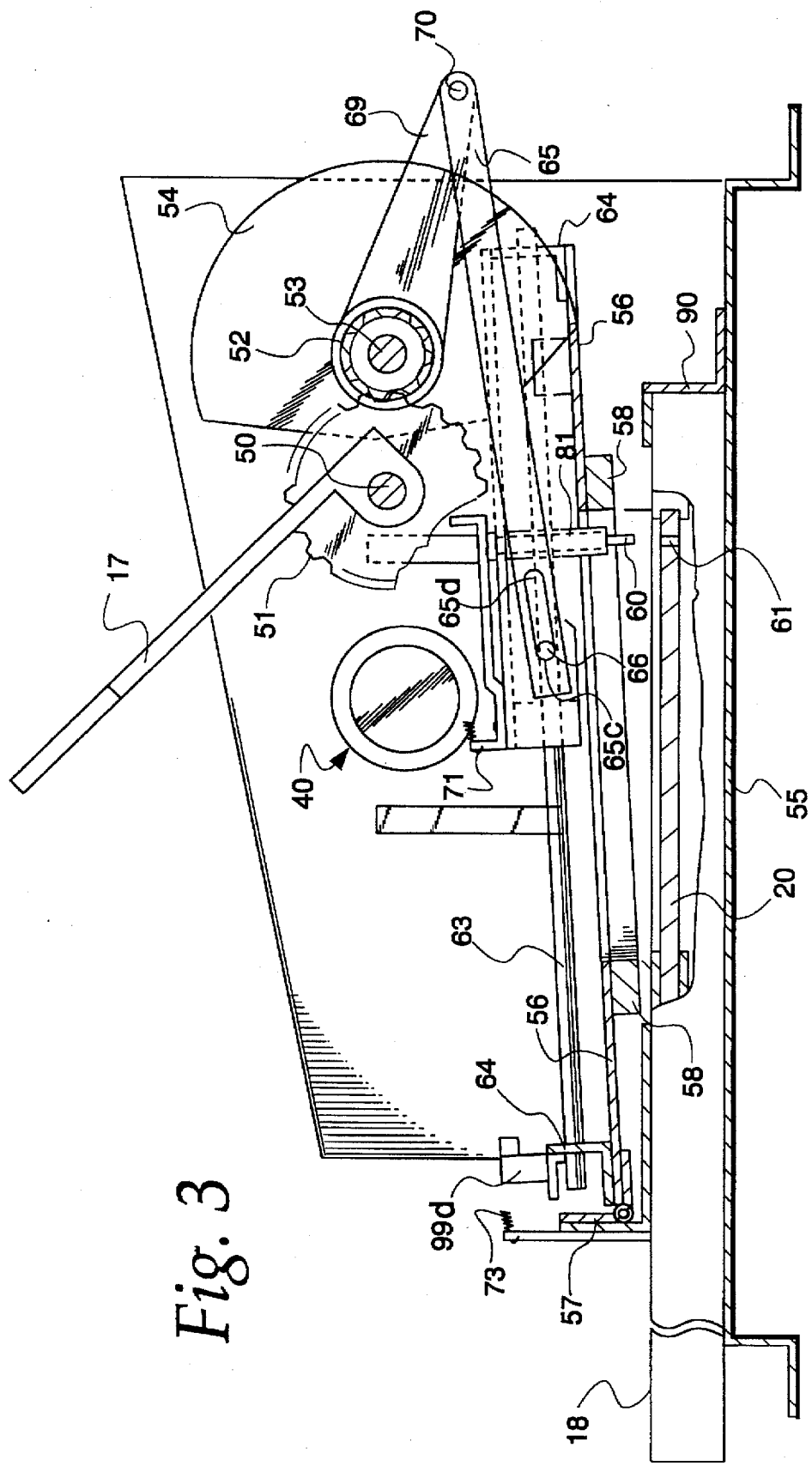
FIG. 3 is a partial sectional view of a cassette locking and slide opening mechanism of the apparatus shown in FIG. 1 in a position to receive a cassette.

A particular problem is to print with sufficient clarity, sharpness of image and suitable contrast onto the film, all in an inexpensive manner. Herein, this is achieved by the use of a suitable lens system 25 and filter 26. The preferred lens system has three lenses 40a, 40b and 40c mounted in a tube 40d. The first lens 40a has a convex face 40e and a planar face 40f. The second lens 40b has convex faces 40g and 40h. The third lens 40c has a planar face 40i and a convex face 40j. The lens system 25 is 3 inches in length and has f/2.5 and is commercially available from JML Optical Industries of Rochester, N.Y. While the lens system 25 provided the sharp image, the image did not have sufficient contrast to make it easy to read on the dark X-ray film. This was overcome by the addition of a yellow filter 26 which is preferably a commercially available celluloid filter such as a Cokin Filter, A375 Fil. A made by Coromofilter SA of Paris, France. As best seen in FIG. 3, the filter 26 may be a thin disk mounted in a typical filter ring 41 threaded onto the lens tube 40d which is mounted on a frame member 42 of the housing 15.

The image is generated and projected horizontally and then is preferably reflected vertically, downwardly in this instance, by a mirror 43 (FIG. 5) that is mounted in frame brackets 44 in the housing 15. The mirror is mounted by the brackets directly over the window opening 19 in the cassette 18. Because the backlighting lumens may vary, for example, the amount of lumens may decay with usage and aging, it is preferred to have an optical sensor 46, such as a photocell, sense the light image to make sure that the image is sufficiently bright. The optical sensor is connected to the computer by leads 46a and suitable adjustments can be made to increase the light output of the backlight 23 or to signal that it should be replaced. Thus, there is a safeguard against a number of cassettes being flashed with the images having insufficient contrast that they cannot be read after flashing.

Figure 4:
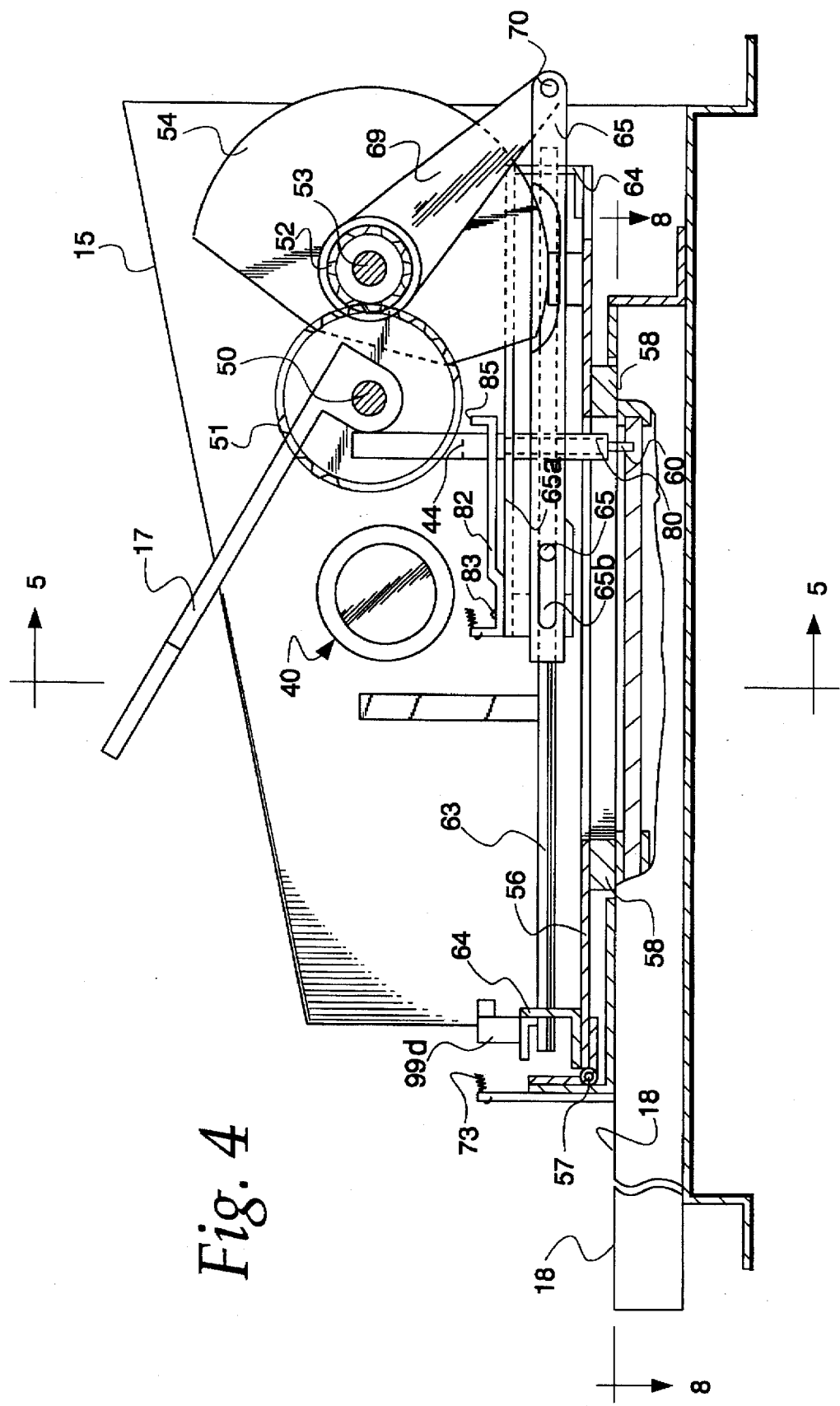
FIG. 4 is a partial sectional view of the cassette locking and slide opening mechanism shown in FIG. 3 at the beginning of an opening operation of the cassette window slide.

To provide a good indication to the operator that a flashing operation is being done to a cassette 18, and to provide a low cost mechanism, there is provided the manually-operated handle 17 that is pulled downwardly, as viewed in FIGS. 3 and 4 by the operator, and provides the force to lock the cassette 18 in place and to open the window slide 20. Herein, the handle 17 is in the form of an upright lever having a lower end fixed to a turnable shaft 50 that is supported horizontally for turning about its horizontal axis by frame members 44 of the housing 15. The upright lever is mounted exteriorly of and adjacent a righthand vertical sidewall 15a (FIG. 1) of the housing; and on the inside of this sidewall is a large gear 51 (FIGS. 4 and 5) that is meshed with a smaller gear 52 fixedly secured to a horizontal, rotatable driving shaft 53 mounted in frame members 44 of the housing 15. Also, fixed to driving shaft 53 is an actuator means in the form of a cam 54 that causes a locking of the cassette 18 against removal, as will be explained later.

It is desired to lock the cassette 18 against removal for the short period of flashing which is about three seconds in total operation of which the X-ray film exposure to the image is about 0.33 second. Herein, the locking operation is achieved by a clamping of the cassette 18 between an underlying, horizontal housing plate 55 and an overhead clamping plate 56. The clamping plate 56 is normally spaced from clamping engagement with the cassette 18 so that the cassette 18 may be easily inserted or removed from the slot 16. In its release position show in FIG. 3, the forward end of the clamping plate 56 is raised above and spaced from the cassette 18 and in the locking position this forward end of the clamping plate 56 is pushed and held downwardly against the cassette 18 by the cam 54 on the shaft 53. Herein, the clamping plate 56 is pivotally mounted at its rear end by a hinge 57 which has a vertical leaf fixed to a frame member of the housing for turning about a horizontal pivot axis, and a substantially horizontal leaf fixed to the rearward end of the clamping plate. In the release non-clamping position of FIG. 3, the forward end is inclined upwardly above and spaced from the underlying cassette. The cam 54 is turned through the first one-third turning of the handle 17 and abuts the clamping plate 56 and keeps pushing the clamping plate 56 to pivot downwardly to clamp the cassette 18 against the underlying frame 55, as shown in FIG. 4.

In accordance with this invention, the clamping plate has a dual function member, or pad 58, that functions as a light shield and as a clamp to resist a pulling force trying to remove the cassette 18 from the slot 16. In this instance, the pad has a rectangular opening therein as does the clamping plate 56 having an opening aligned with the cassette window to allow the image to pass through the respective openings. The preferred pad 58 is a resilient, compressible pad of elastomeric material which is compressed by the clamping plate and the cam tightly against the top of the cassette with a wide surface area contact. The compressed gasket pad 58 intimately engages the cassette top wall 18a and blocks any light paths due to any irregularities in the pad or top wall of the cassette. If the gasket pad 58 is too soft, the material may tear when a high pullout force is applied to the cassette 18. If the gasket pad 58 is too hard, it will not be as effective as a seal, and the cassette 18 may slide across this hard surface when the cassette 18 is pulled with a high force. A good gasket material is a closed cell foam plastic about 0.100 inch thick with a 40 Durometer.

With the cassette 18 clamped, the handle 17 will now be in position to actuate a window opening and closing mechanism or means, as best seen in FIG. 4, that includes a pin 60 that has been lowered to project into an opening 61 in the window slide and thereby is connected to the window slide 20 to slide it to the left to open the window 19. The pin 60 is mounted on a slide assembly 62 which is carried by the clamping plate for rectilinear travel in the forward and rearward direction along a pair of horizontal, parallel slide rods 63 that are fixed at opposite ends to upright support blocks or brackets 64 which are secured to the top of the clamping plate 56. In order to shift the slide assembly along the rods 63, the slide assembly 62 is driven by a lost motion link assembly which in turn is driven by further operation of the handle 17. When the handle is in the position of FIG. 4, a lost motion link 65 will be positioned so that a pushing end 65a at the right end of a lost motion slot 65b will be engaging a pin 66 projecting through the slot 65b. The pin 66b is connected by a bracket 67 to a slide assembly plate 68 of the slide assembly 62. The link 65 is driven rearwardly to the left, by a lever 69 which has its upper end fixed to the drive shaft 53. The lower end of the lever 69 is connected by a pivot pin 70 to the forward, right hand end of horizontally disposed drive link 65.

As the handle 17 turns counterclockwise, the large gear 51 turns the meshed gear 52 and turns the drive shaft 53 to turn the lever 69 clockwise to push the link to the left and to push the connecting pin 66 and attached slide assembly to the left. The slide opening pin 60 on the slide assembly 62 is carried thereby to the left to push the slide 20 to travel to the left to uncover all of the slide window 19. When the slide assembly 62 has traveled a sufficient distance to fully open the window slide 20 as illustrated in FIG. 6, an upstanding switch actuator 71 on the slide plate abuts the limit switch 99d to signal the computing means 11 that the cassette window is open. Failure to operate the limit input switch 99d, after the other input switches 99a, 99b and 99c indicate that the cassette is properly located, causes a message to appear on the visual display 38 and/or a disablement of the optical character generator. On the other hand, a proper operation of the input switches 99a–99d enables the computing means 11 to begin or causes it to begin the printing cycle.

Figure 7A:
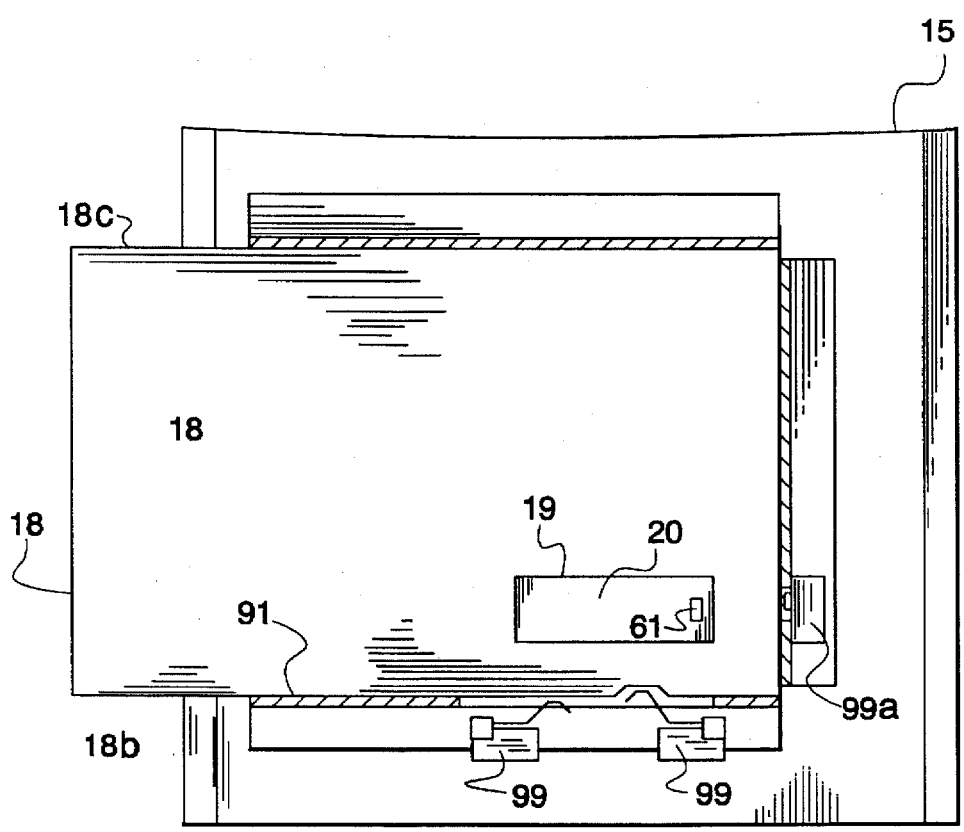
FIG. 7a illustrates input switches for sensing a cassette properly positioned for printing through a window therein.

After printing, the operator will lift the handle and reverse the operation described above with end 65c of the slot in the link 65 engaging the pin 66 on the slide assembly 62 forwardly, i.e., to the right, with the pin 60 pulling the slide plate 68 to the right. The slide 20 is fully closed before the cam 54 is reversed and moved from engagement with clamping plate as the handle 17 is returned fully to its upper position. As best seen in FIG. 7, a spring 73 serves to assist return of the slide assembly 62 and to bias the forward end of the clamping plate to raise to release the cassette 18 for removal. The illustrated spring 73 is a long contractile spring having one end fixed to the housing frame adjacent the hinge 57 and extending therefrom over the top of the slide assembly 63 to a grooved roller mounted on the drive shaft 53. The spring extends over the top of the grooved roller 74 to and end 73b fixed to the rear of end of the carrier slide. The portion of the spring 73 between the grooved roller 74 and the spring end 73b exerts an upward force component to the slide assembly and to clamping plate to pivot the latter in a counterclockwise direction about the axis of hinge 57. This lifts the clamping plate to the release position spaced from the cassette.

To assure that the cassette 18 is properly located so that cassette slide 20 has its opening 61 aligned directly beneath the pin 60 to accept the pin 60, and the clamping plate is lowered to grip the cassette 18, there are provided input switches 99a, 99b and 99c, as best seen in FIG. 8. The switch 99a is a normally open limit switch that will be closed when the cassette is pushed fully inward against a stationary stop/go on the housing frame to assure that the slide opening 61 is at a depth aligned with the pin 60. A similar, normally open limit switch 99b will be closed when the cassette is pushed against a lateral side stop 91 to assure that cassette is laterally over to the right end of the slot 16 to position the slide opening 61 laterally in alignment with the pin 60. To sense that righthand side 18b of the cassette, rather than the lefthand side 18c, is against the lateral stop 91, a limit switch 91c, which is a normally a closed switch, will be open when the limit switch finger is in a groove 93 that is in the sidewall 18b of cassette. The opposite cassette sidewall 18c lacks any such groove. The three switches 99a, 99b and 99c are connected in series and when anyone of the switches is not in its proper position after insertion of the cassette, the circuit is open and this disables and/or causes the computer means not to print and to provide a command on the visual display 38 indicating that the cassette is not properly aligned to receive the pin 60 to open the cassette slide 20.

As best seen in FIG. 7, the slide opening mechanism herein is designed not to be operated by the handle 17 if the pin 60 is not properly coupled to the cassette window slide 20; that is, if the pin 60 does not travel downwardly through a predetermined travel distance, e.g., ⅜ inch. The pin 60 is attached to the lower end of a vertical plunger 80 slidable in a vertical bore in cylindrical guide boss 81 located on the underside of the clamping plate. The top end of the plunger is biased by a spring 82 secured to the top of the carrier plate 68 by a fastener 83. The illustrated spring is a flat horizontal leaf spring abutting the upper end of the pin plunger 80 and pushing the plunger 80 and the pin 60 down to insert the pin 60 into opening 61 in the cassette slide. When the cassette is properly positioned, the pin 60 is shifted downwardly through the ⅜ inch displacement needed to insert the pin 60 through the hole 61 in the slide 20 and to push an internal catch member (not shown) on the slide 20 to allow it to travel in the open direction. If the cassette 18 is somehow misaligned, or if the cassette 18 is inverted so that window 19 and slide 20 face down instead of facing up, the pin 60 will not travel down the full extent of the travel distance with the result that the upwardly projecting tab or finger 85 will be in a position to abut the right side of the stationary frame bracket 44 that holds the lens assembly 25. The tab or finger 85 is an integral part of the leaf spring 82 so that, when the spring 82 is lifted by the plunger 80 and attached pin 60, the tab 85 stays upright and will abut the bracket preventing the slide 20 from moving in the slide opening direction. When the pin 60 moves into the opening 61 and unlatches the slide, the tab 85 is lowered to slide 20 below the stationary bracket 44.

Turning now to FIG. 8, the block diagram shown illustrates computer control circuitry used with the system 10. A power supply 100 supplies +5 volts ($V_{cc}$) via connection 101 and supplies −15 volts and +15 volts via connections 108 and 109, respectively, to supply power to the system 10. In accordance with the invention there is provided an apparatus for printing patient identifying and X-ray machine identifying information onto the X-ray film and through the X-ray cassette 18 comprising the digital computer 11 and a digital storage device. As embodied herein, the digital computer and digital storage device are provided by CPU 11a connected to ISA bus decoder 11b via bus connection 115. The ISA bus decoder 11b interfaces the CPU 11b to the LCDs block 102, the serial ports block 103, the I/O controls 105, the keyboard block 106 and the printer block 107. Details of each of the functional blocks are described below.

Figure 9A:
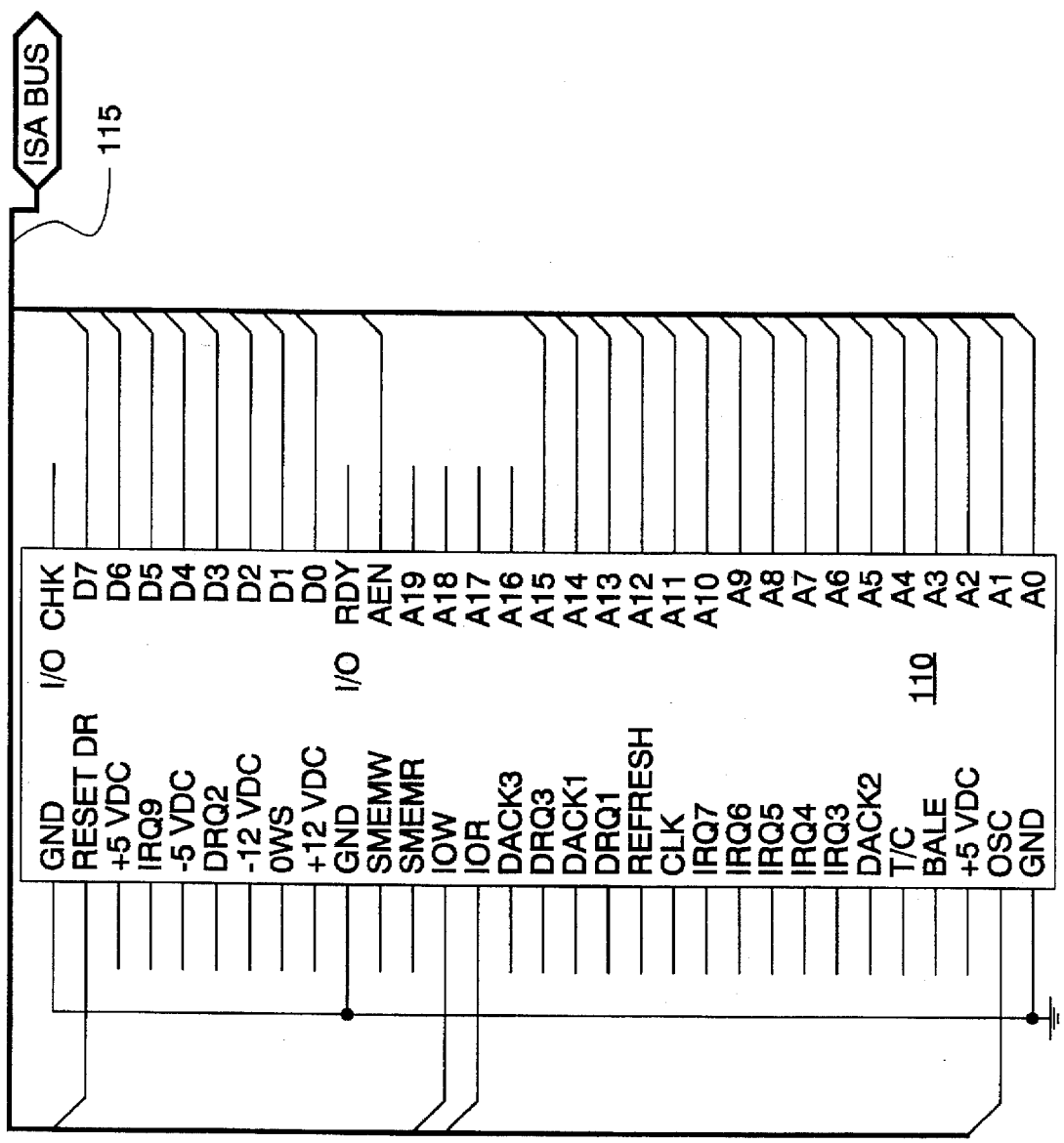
FIG. 9A is a schematic diagram of a 62 pin card edge connector for connection with an industry standard architecture bus (ISA bus)
Figure 9B:
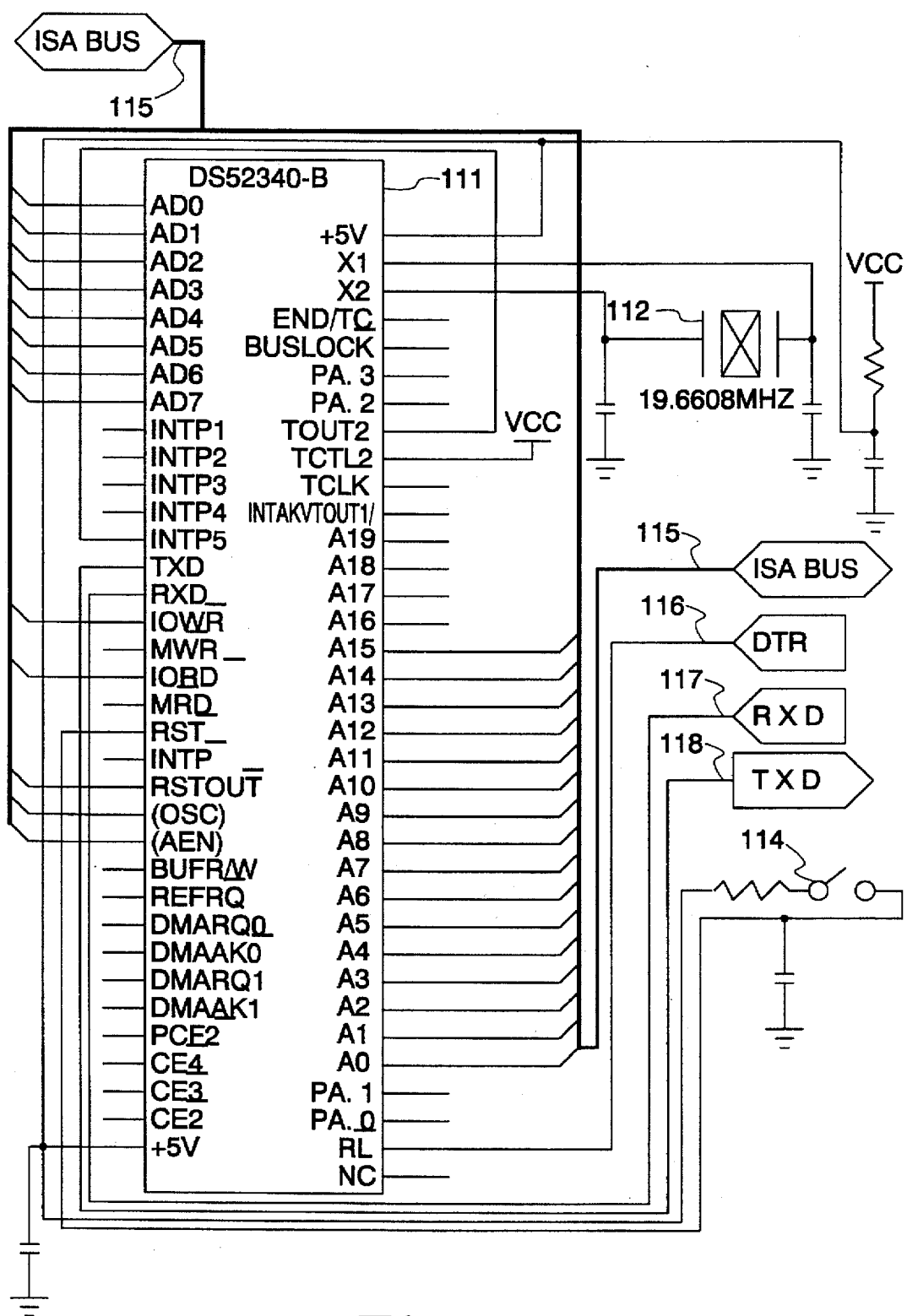
FIG. 9B is a schematic diagram of a Dallas Semiconductor DS52340-B computer chip including an NEC V40 10 MHZ microprocessor a 256 kilobyte battery backed RAM, timers and interrupt interfacing.
Figures 10, 10A:
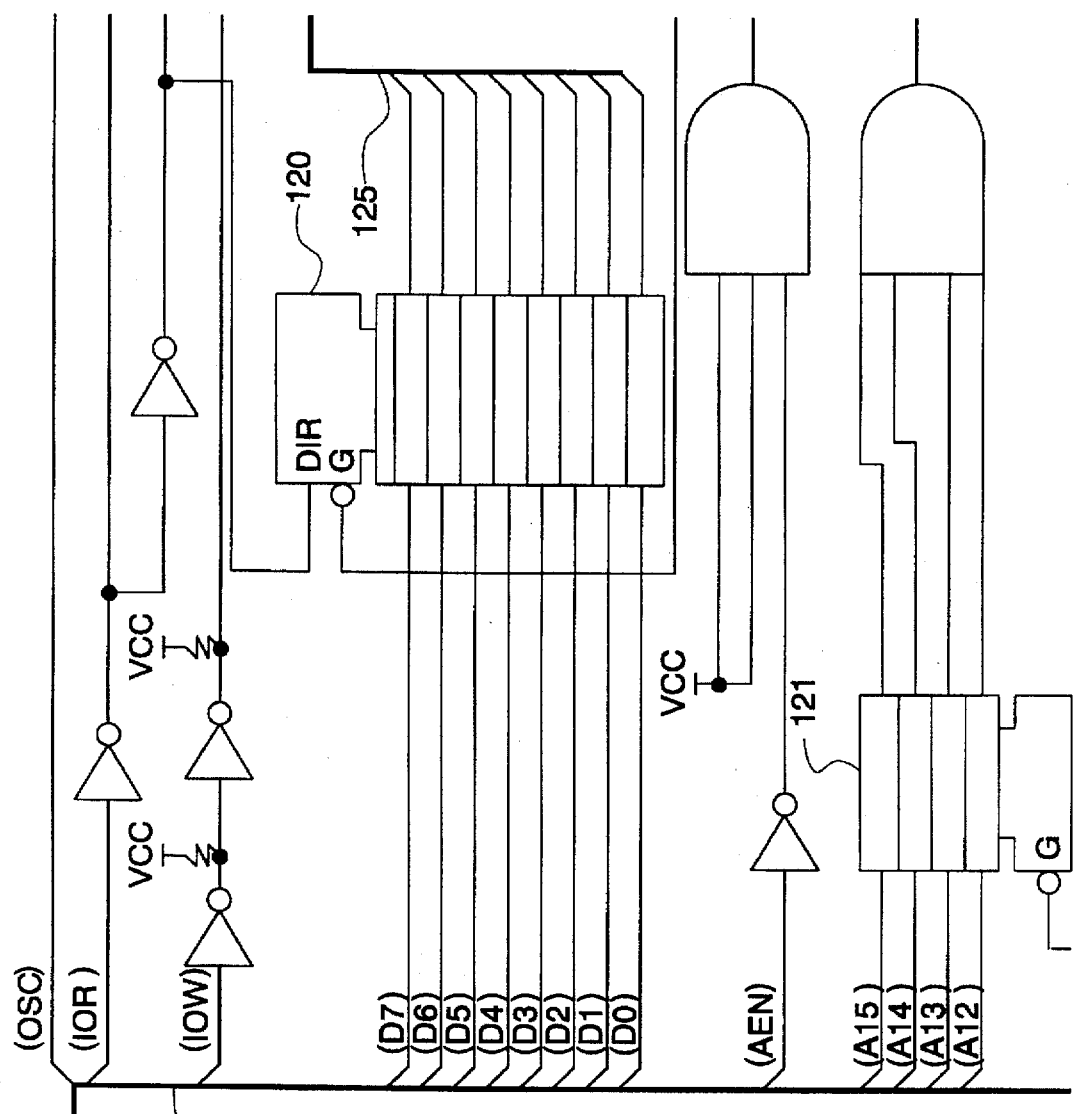
FIGS. 10A–D are schematic diagrams of ISA bus decoder circuitry of the apparatus shown in FIG. 1.
Figure 10B:
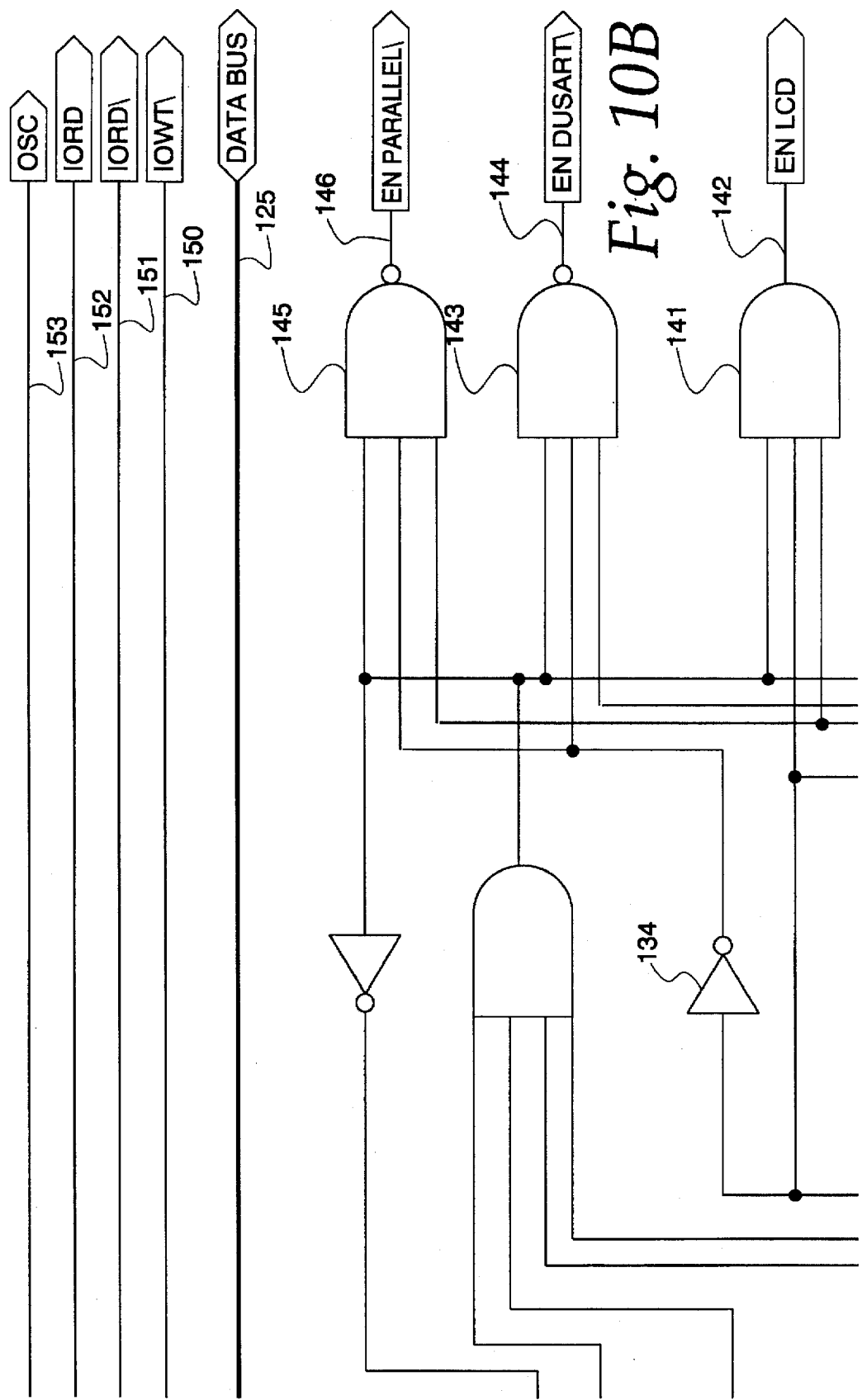
Figure 10C:
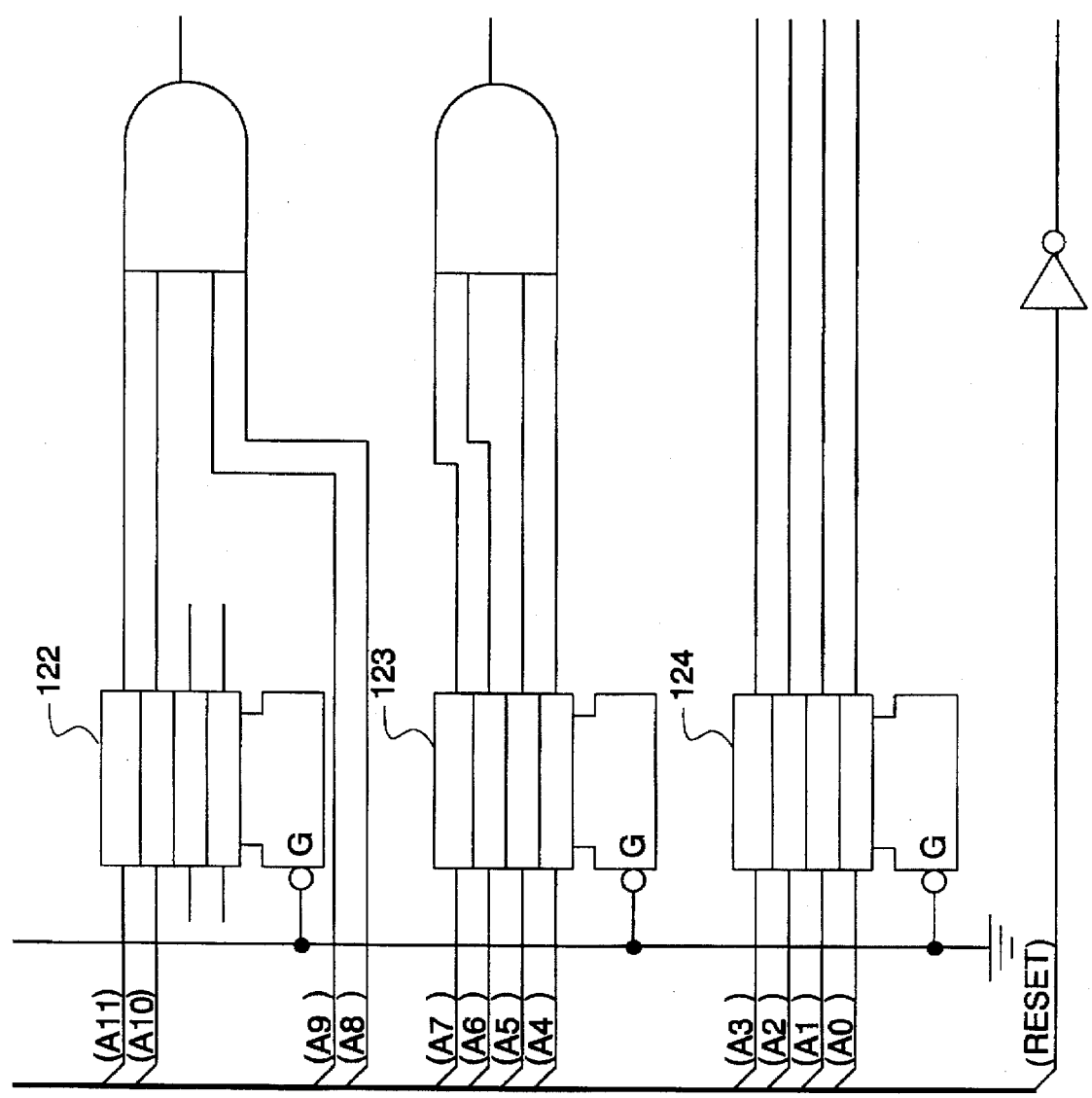
Figure 10D:
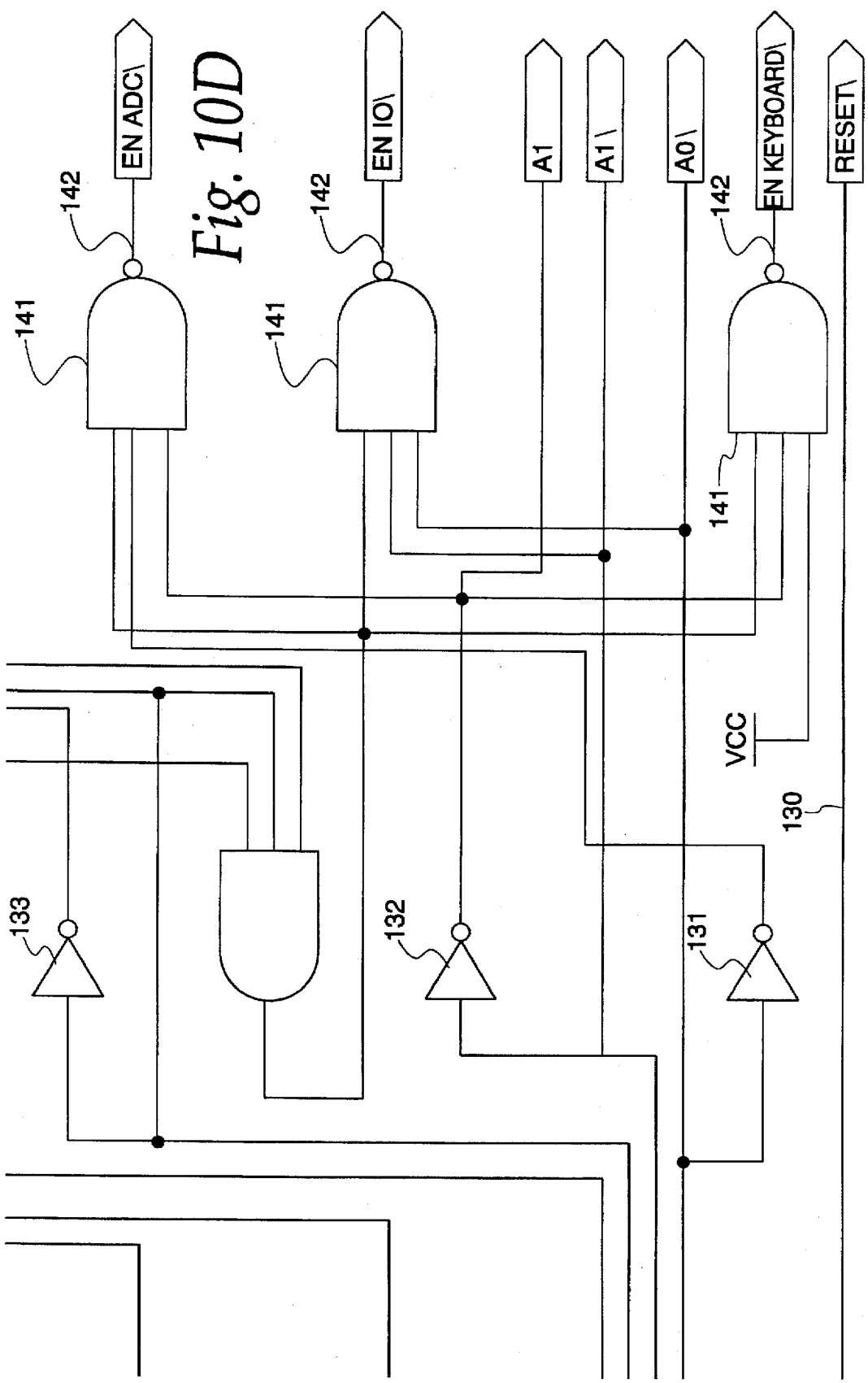

FIGS. 9A and 9B illustrate the block of CPU 11a in greater detail. A 62 pin card edge connector 110 is connected to the industry standard architecture ISA bus 115, providing an IBM type personal computer compatible bus connection which allows a personal computer to be interfaced with the system 10 to provide the digital computer and the digital storage device in accordance with the invention.

FIG. 9B illustrates the ISA bus 115 connected to a DS2340 computer chip 111 which derives its clock signal from a 19.6608 MHz crystal 112. As embodied herein, the digital computer and digital storage device are provided in the computer chip 111 which are resident on the Dallas semiconductor DS2340 "soft flip stik" which is the computer chip 111. The system CPU of the computer chip 111 is NEC V40 processor.

The computer chip 111 includes an "A" side and a "B". The "B" side has been employed in the embodiment of the present invention and features the V40 10 Mhz processor, a battery backup RAM (up to 256 Kilobytes); hardener module providing watchdog and RAM battery protection and downloading of kernel software. The computer chip 111 provides all system RAM, timers and interrupt interfacing. The "B" side of the computer chip 111 looks like an IBM PC-XT bus and provides an IBM XT compatible personal computer thereby. Further, the PC compatible computer provided herein allows the implementation of security to maintain integrity of the system 10 with access protection requiring the entry of a password. A reset switch 114 is provided to reset the computer chip 111. Programming interface signals including data terminal ready (DTR), receive data (RXD) and transmit data (TXD) are provided via connections 116, 117 and 118, respectively, to facilitate programming of computer chip 111 which will be discussed in further detail below.

As illustrated, the connector 110 of FIG. 9A and the computer chip 111 of FIG. 9B provide alternative means for providing a digital computer and a digital storage device for use with the embodiment.

FIGS. 10A–D are schematic diagrams showing digital circuitry which implements the ISA bus decoder 11b of FIG. 8. In accordance with the invention, the CPU 11a with ISA bus decoder 11b provides a bus connecting the digital storage device, the keyboard 12 and communication ports to the digital computer of CPU 11a. The digital computer and the digital storage device, both resident on the computer chip 111, are connected via a bus within the computer chip 111. As illustrated, address and data signals are latched from the ISA bus 115 and provided as decoded bus signals for use by other portions of the system 10. Data signal D0 through data signal D7 are latched with a latch 120, the output of which provides a data bus 125 for D0–D7. Address signal A0 through address signal A15 are latched via latches 121, 122, 123 and 124. As provided herein, all hardware ports are I/O mapped and occupy less than 16 bytes. The details of the I/O interfacing and I/O address bus decoding are shown in FIGS. 10A–10D.

Devices are selected with A4–A15 and particular I/O addresses A0–A3, which have been latched in latch 124. The complements of A0–A3 are provided by inverters 131, 132, 133 and 134, respectively. A three input NAND gate 135 decodes EN KEYBOARD\ 136 at address 0×300 hexadecimal. A NAND gate 137 decodes EN IO\ 138 at address 0×302 hexadecimal. A NAND gate 139 decodes EN ADC\ 140 at address 0×303 hexadecimal. A three input AND gate 141 decodes EN LCD 142 at addresses 0×304 to 0×307 hexadecimal. A three input NAND gate 143 decodes EN USART\ 144 at addresses 0×308 to 0×30b. A three input NAND gate 145 decodes EN PARALLEL\ 146 at addresses 0×30c to 0×30f hexadecimal. Other bus signals derived from the ISA bus 115 with the ISA decoder 11b of FIGS. 10A–10D include A0\ 126, A1\ 127, A1 128 and RESET\ 130. Buffered I/O read and write signals and the oscillator signal (OSC) are provided via connections 150, 151, 152 and 153, respectively.

In accordance with the invention there is provided the optical character projector 22 operable by the digital computer CPU 11a to generate a data image responsive to said patient identifying and X-ray machine identifying information stored in said digital storage device for projection on the X-ray film. As embodied herein, the optical character projector 22 is illustrated in LCDS block 102 in FIG. 8 and comprises the flasher LCD 24 illustrated in detail in the schematic of FIG. 11. Herein the flasher LCD 24 is a Hitachi LCD graphic\alphanumeric display model no. LMG6381QHGE having backlighting. Various identifying indicia and sequential indicia may be printed on film with the flasher LCD 24. There also is provided an external display for displaying identifying information to a person. As embodied herein, the external display comprises the user LCD 14. Herein the user LCD 14 is a Hitachi LCD graphics/alphanumeric display model no. LMG6401PLGE having backlighting. The user LCD 14 and flasher LCD 24 are backlit under the control of inverters 161 and 163, respectively. The inverters 161 and 163 are controlled via connections 160 and 162, respectively, which provide signals therefor as BACKLIGHT 1 and BACKLIGHT 2. The LCD backlights are thus computer controlled enabling the digital computer of CPU 11a to control film exposure by the flasher LCD 24 by controlling BACKLIGHT 2 via connection 162.

The optical character projector 22 is thereby inhibited by the digital computer 11 after generation of the data image for projection on the X-ray film. The user LCD 14 and flasher LCD 24 are powered via VCC 101 and the −15 volt connection 109.

Figure 12:
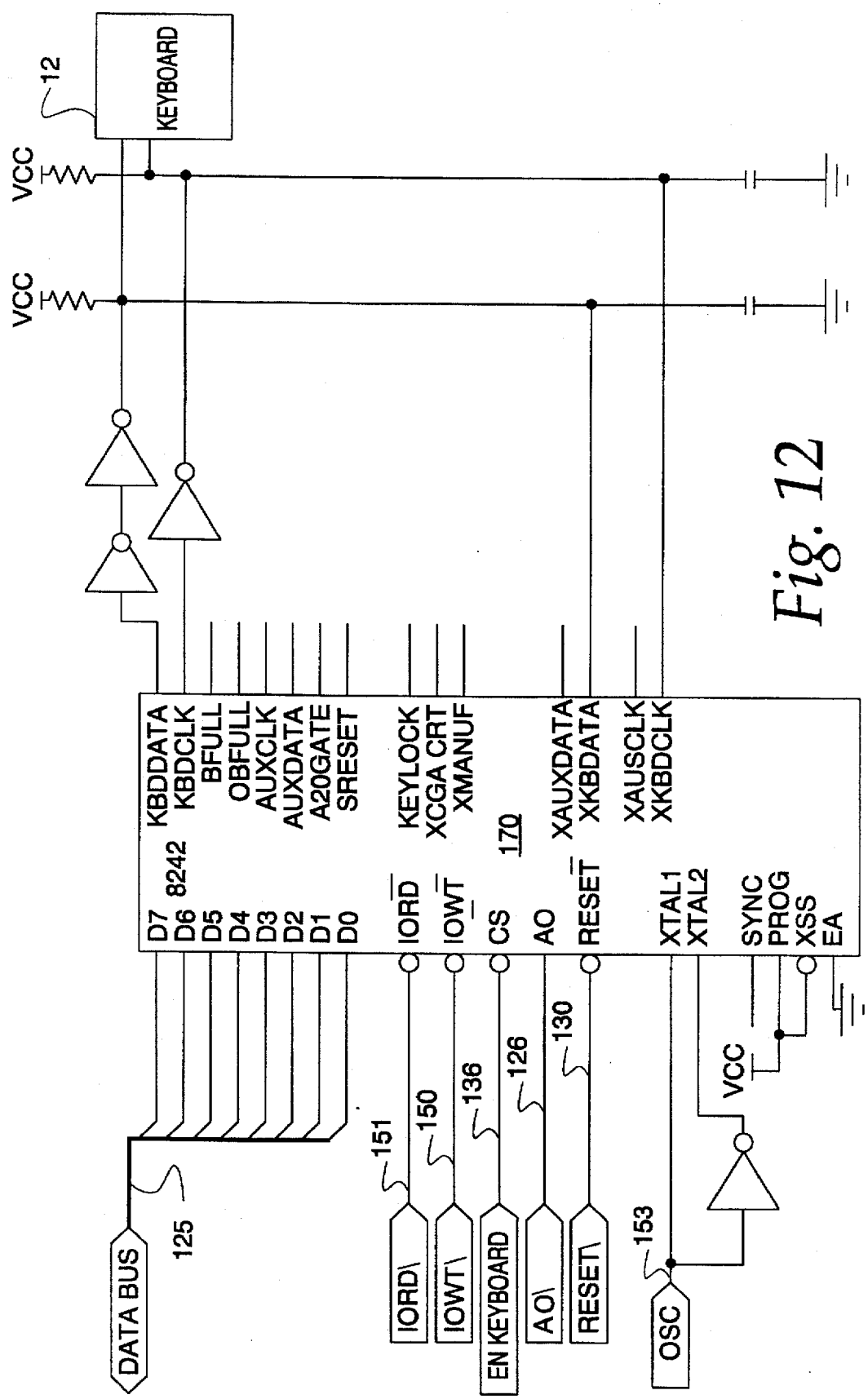
FIG. 12 is a schematic diagram of the keyboard and keyboard control circuitry of the apparatus shown in FIG. 1.

In accordance with the present invention there is provided a keyboard operable by a person to generate data signals. As embodied herein, such keyboard means is provided in block diagram form in FIG. 8 as keyboard block 106 and illustrated in detailed schematic diagram in FIG. 12. In FIG. 12 the keyboard 12 is interfaced to the ISA bus decoder 11b via a keyboard peripheral interface chip 170, herein the 8042 peripheral device. The interfacing of the keyboard 12 with other portions of the system 10 is done in a manner well known in the art.

Figure 13:
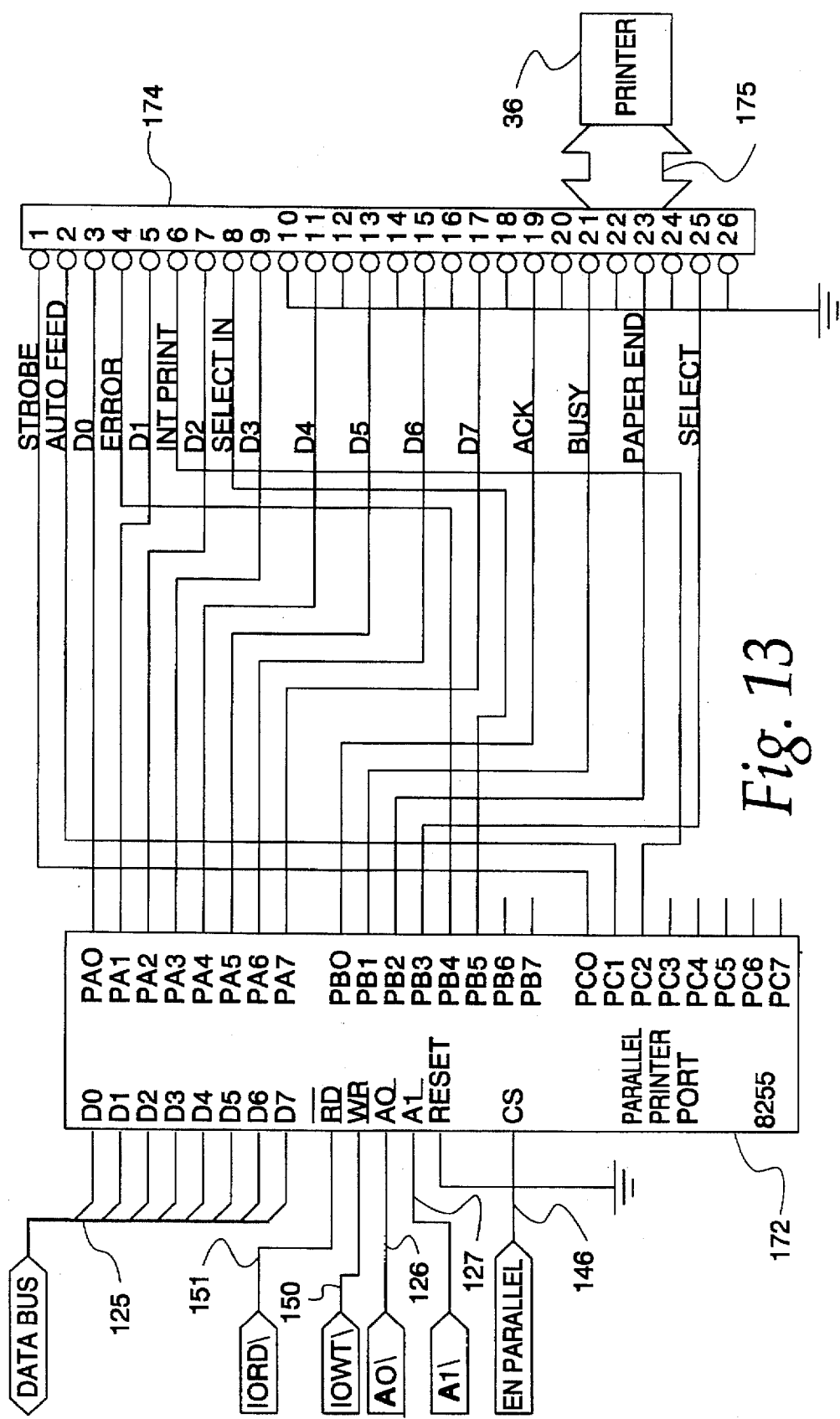
FIG. 13 is a schematic diagram of the printer and parallel printer port of the apparatus shown in FIG. 1.
Figure 14:
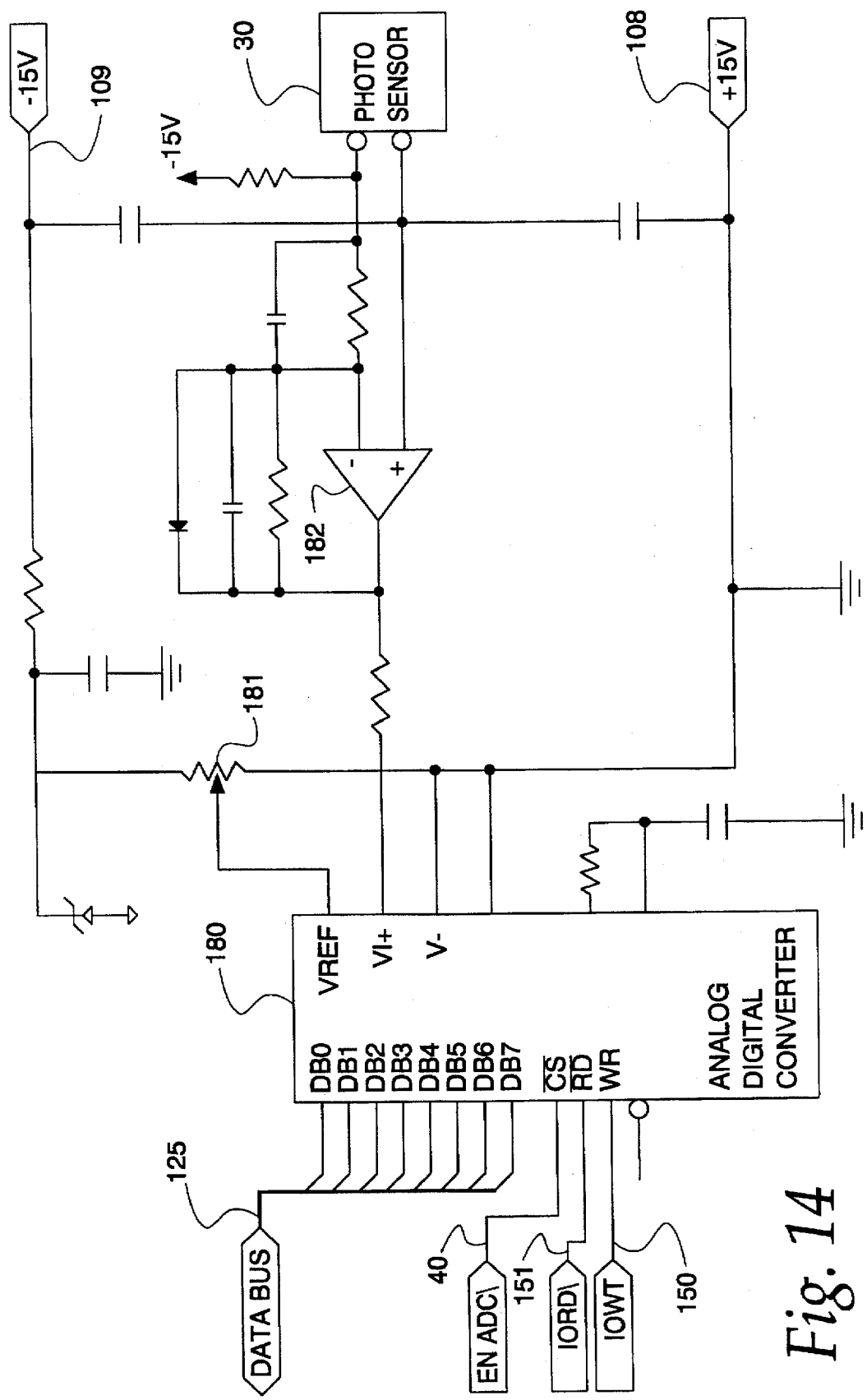
FIG. 14 is a schematic diagram of the photo sensor, amplification, filtering and analog-to-digital (ADC) conversion circuitry of the apparatus shown in FIG. 1.

There also is provided a printer connected to the digital computer 11 via the data bus 125 for printing information. Accordingly, the digital storage device of the CPU 11a, as described above, saves the patient identifying and the X-ray machine identifying information for a predetermined period of time. Then, the CPU 11a may retrieve saved patient identifying and X-ray machine identifying information for a predetermined period of time for providing a hard copy printout. Typically, it would be desirable to print out all patient and X-ray information at the end of an operating period, for instance, a day. As embodied herein, printer block 107 of the block diagram of FIG. 8 is shown in detail in FIG. 13 illustrates a parallel port printer interface for sending information via data bus 125 to the printer 36. Additionally, the printer 36 could be connected to any of the serial interface ports discussed below. A parallel printer port 172 is provided as an 8255 peripheral interface chip having three ports A, B and C which are connected to a parallel port connector 174 providing input and output pins according to convention as illustrated in the drawing. The parallel printer port 172 is chip selected with EN PARALLEL 146. A0\ 126 and A1\ 127 provide addressing and IORD\ 151 and IOWT\ 150 direct read and write operations to the parallel printer port 172.

A sensor is provided in accordance with the invention for measuring the light output of the flasher LCD backlight, allowing the digital computer of CPU 11a to determine from the sensor the predetermined period of time to expose the X-ray film to provide a proper exposure thereof. As embodied herein, the sensor comprises a photo cell or photo sensor 130 which is amplified and filtered by an operational amplifier 182. The analog signal output of the operational amplifier 182 is analog-to-digital converted via an analog-to-digital convertor (ADC) 180. Conversion voltage reference is provided via a potentiometer 181. Digital data representative of the output of the photo sensor 30 is sent over the data bus 125. The ADC 180 is enabled via EN ADC\ 140 and read and write operations are controlled via IORD\ 151 and IOWT\ 150.

X-ray film exposure, when printing the label, is controlled via the time duration of the flasher LCD backlight 23 of the flasher LCD 24 as discussed above. Of course, a camera shutter means could also be provided for providing the proper exposure to the X-ray film. Advantages are realized, however, by the precise computer control of exposure via the backlight 23. For instance, by having the backlight 23 selectively operated by the digital computer 11 to project the data image for a predetermined period of time to expose the X-ray film, by providing X-ray film density to the computer 11, the computer 11 may determine from the film density the predetermined period of time to expose the X-ray film.

Figure 15A:
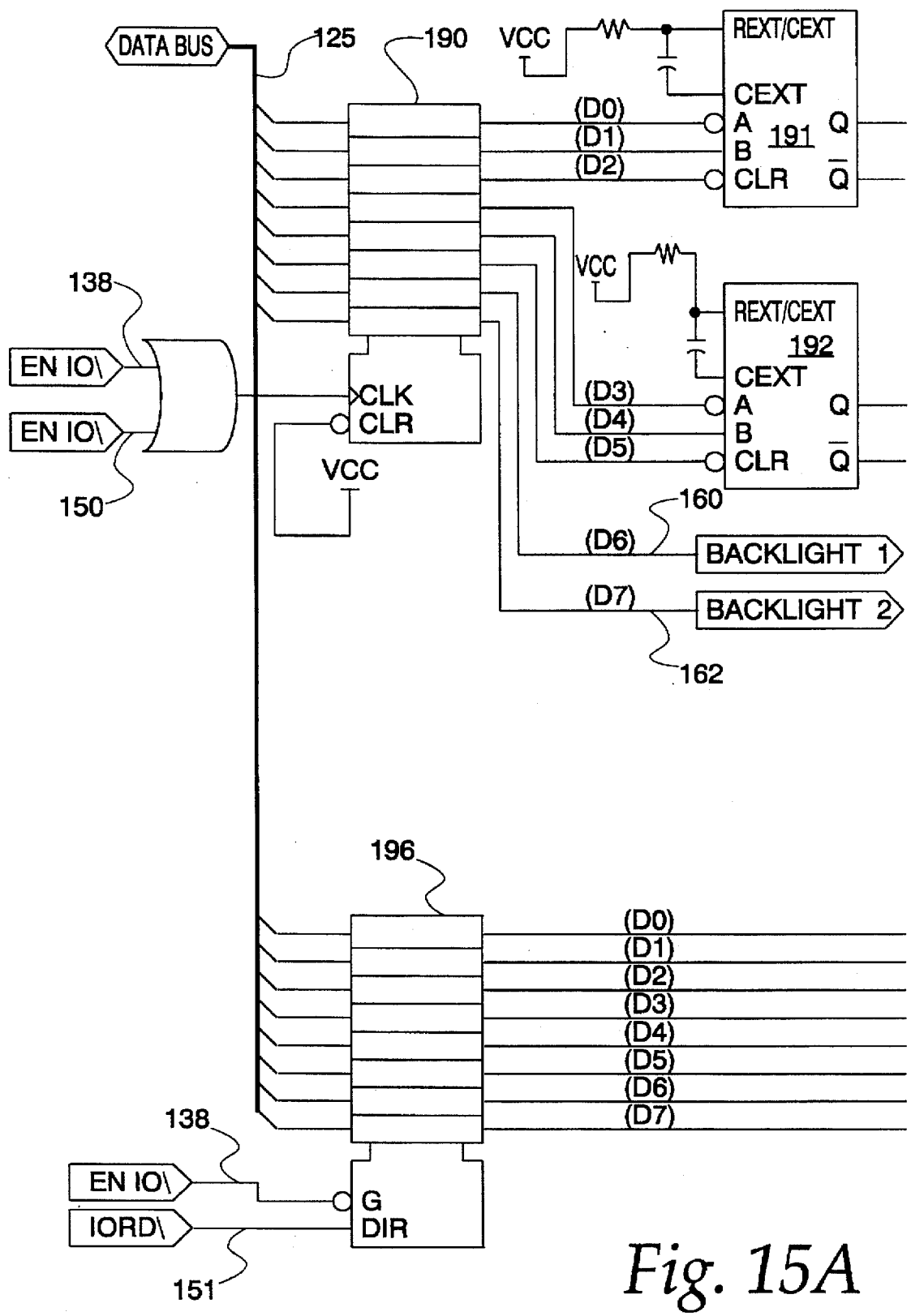

The embodiment described herein includes the handle 17 for exposing the X-ray film operable to open the X-ray cassette 18 when supported by the frame of the housing 15 and slot 16, exposing the X-ray film through the window 19 with the optical character projector of the flasher LCD 24 and backlight 23. As discussed further below, improper operation of the handle 17 is indicated on the user display or user LCD 14. Also in accordance with the invention there may be provided a solenoid responsive co the digital computer 11 for locking the handle 17 while the X-ray cassette 18 is being opened thereby. As embodied herein, solenoids 195 are provided for such control and locking, as indicated in FIGS. 15A and 15B which represent a portion of I/O controls 105 of FIG. 8. For the operation of solenoids 195, EN IO\ 138 and IOWT\ 150 are ORed and provided as a clocking signal to input data on the data bus 125 to a data register 190. Timers 191 and 192 are connected to the data of the register 190 to provide a time signal of a predetermined duration to activate the solenoids 195 via switching transistors 193 and 194 used for switching power to the solenoids 195.

Figure 11:
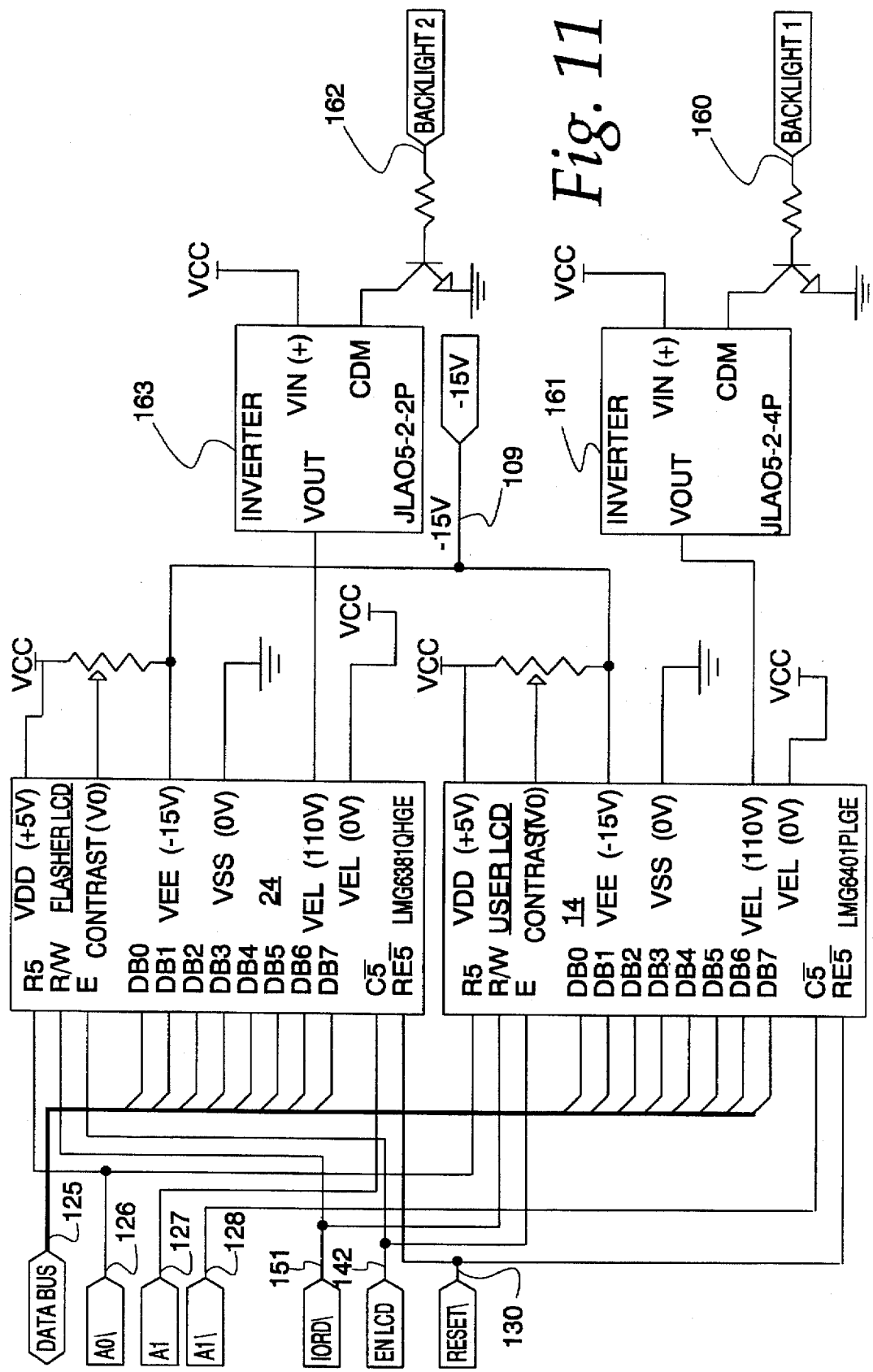
FIG. 11 is a schematic diagram of flasher LCD and user LCD circuitry of the apparatus shown in FIG. 1.

I/O control data bits D6 and D7 of the data register 190 control BACKLIGHT 1 160 and BACKLIGHT 2 162, respectively, to control the user LCD 14 and the flasher LCD 24, as shown in FIG. 11 above.

Also shown in FIGS. 15A and 15B are means for reading input switches 99 for ascertaining the proper positioning of the X-ray cassette 18 within the slot 16 of the housing 15. As illustrated in FIGS. 15A and 15B, a data register 196 is controlled via EN IO\ 138 and IORD\ 151 to read input switch settings of the input switches 99. Data stored in the register 196 is then communicated via the data bus 125. As illustrated in FIG. 11b, 8 data bits D0–D7 are pulled high to $V_{cc}$ via pullup resistors. Thus, 8 input switches of input switches 99 connected at one end to ground are used to pull down any of the 8 data bits.

Figure 16A:
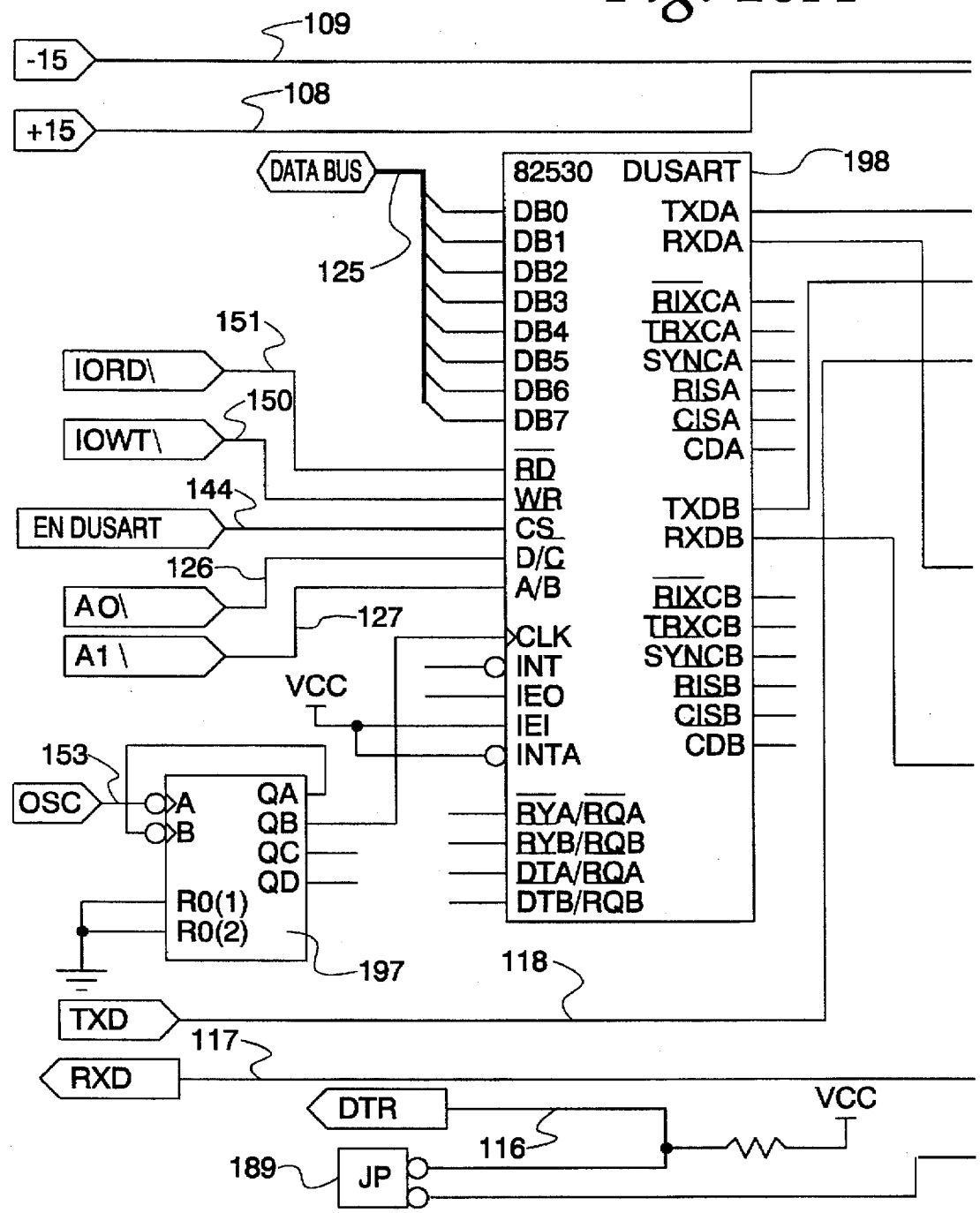
FIGS. 16A and B are schematic diagrams of interface port circuitry of the apparatus shown in FIG. 1.

The serial ports 103 of the block diagram of FIG. 8 are illustrated in schematic diagram form in FIGS. 16A and 16B and provide communication means for receiving data signals from remote apparatus. Three (3) RS232 serial interfaces are provided, namely a programming computer interface of port 31, the X-ray interface of port 33 and the computer interface of port 35. The CPU 11a may be programmed via its programming interface which includes DTR 116, RXD 117 and TXD 118 as discussed above. The programming interface of the CPU 11a is used for downloading programs to the CPU 11a via the programming computer interface port 31. The RS232 line receivers are provided as receiver 185 for port 35, receiver 186 for port 33, and receiver 187 for port 31. Additionally, DTR 116 is provided via the programming interface port 31 through line receiver 188, which is removable via a jumper 189.

The X-ray interface port 33 and the computer interface port 35 are provided through a dual universal asynchronous receiver transmitter chip (DUSART) 198, which is a 82530 chip taking data inputs via data bus 125 and clocked via OSC 153 which is divided with a counter 197. DUSART 198 is enabled with EN DUSART 144. A0\ 126 and A1\ 127 provide addressing and IORD\ 151 and IOWT\ 150 provide read and write signals for DUSART 198.

Figure 17:
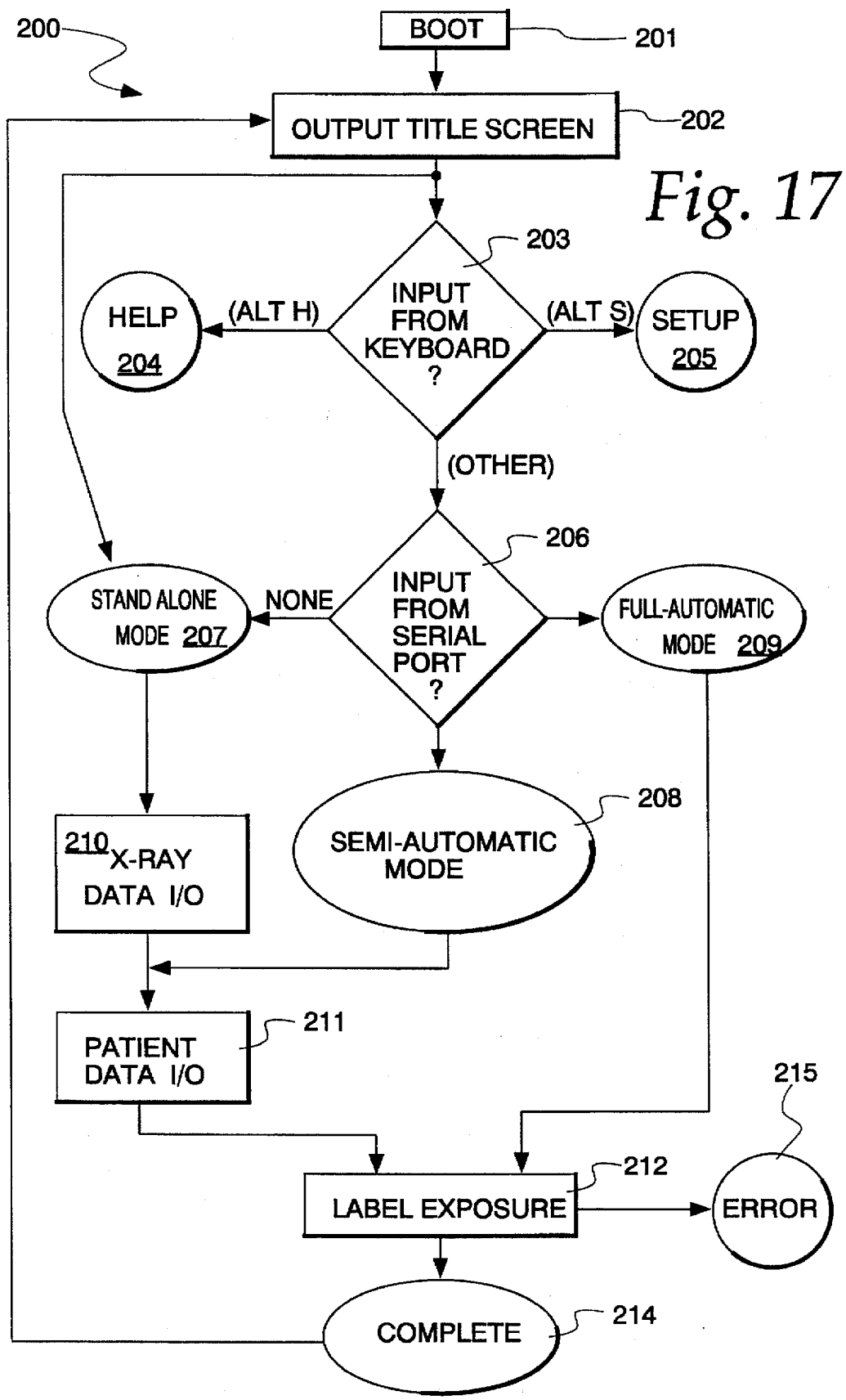
FIG. 17 is a simplified program flow diagram of the system software of the apparatus shown in FIG. 1.

Turning now to FIG. 17, a program flow diagram is generally illustrated at 200. In simplified terms, the flow diagram 200 generally illustrates the principal operation of the software used with the system 10. In particular, the program flow diagram 200 illustrates the three modes of operation of the system 10. As will be described, in accordance with the present invention there is provided means for selecting between the keyboard and the communication port as having the patient identifying and the X-ray machine identifying information present in signals therefrom, thereby defining a stand-alone mode of operation wherein the patient identifying information and the X-ray machine identifying information is present in data signals from the keyboard. A semi-automatic mode is established wherein the X-ray machine identifying information is present in data signals from the communication port, the patient identifying information being made available only via the keyboard. Finally, an automatic mode of operation is provided wherein the patient identifying information as well as the X-ray machine identifying information is present in data signals from the communication port.

The system 10 is initially booted up at boot block 201. Then, program flow proceeds to output title screen 202. By default, the system 10 proceeds to its stand-alone mode 207; however, input from the keyboard 12 determines the program flow of the system 10 at 203 wherein an <AltH> input causes the system 10 to provide user help at help 204. An <AltS> input causes the system 10 to enter setup 205 to select operating parameters for the system 10, as discussed further below. Any other input at the keyboard 12 causes program flow to proceed to block 206 where input from serial ports is ascertained. At this point in the operation of the system 10, information including patient identifying and X-ray machine identifying information may be received via either the X-ray interface port 33 or the computer interface port 35.

If no input is received via ports 33 or 35, the system 10 enters a stand-alone mode 207. Semi-automatic mode is indicated at 208 and full automatic mode is indicated at 209. In semi-automatic mode 208 X-ray data IO is communicated to the system 10, indicating X-ray machine identifying information and parameters via serial port 33 or port 35. In the stand-alone mode 207 the X-ray data IO is received at block 210 via the keyboard 12.

Stand-alone mode 207 and semi-automatic mode 208 then receive patient data IO 211 via the keyboard 12 which provides patient identifying information to the system 10. Full automatic mode 209, on the other hand, requires no input via the keyboard 12 but rather, both X-ray data IO and patient data IO is provided via either port 33 or port 35, requiring no user interaction and hence full automatic mode of operation for the system 10. At label exposure 212 the patient identifying and X-ray machine identifying information is printed on the X-ray film and completion is indicated at 214, which returns program flow to output title screen 202. Any erroneous operation in the label exposure 212 program flow is indicated at 215, which will alert the user via user LCD 14. Such erroneous operation may include inappropriate or premature operation of the handle 17, among other things.

The three modes of operation provided in accordance with the present invention, as described with reference to program flow diagram 200, comprises first means for determining whether patient identifying information is present in data signals from the keyboard 12. Additionally, second means for determining whether patient identifying information is present in data signals from the serial communication ports 33 and 35 is also provided. Then, the CPU 11a comprises means responsive to the first and the second patient identifying information determining means for storing patient identifying information in the digital storage of the CPU 11a. Further, means for determining whether X-ray machine identifying information is present in data signals from the keyboard 12 and means for determining whether X-ray machine identifying information is present in data signals from the serial communication ports 33 and 35 are also provided. The CPU 11a then comprises means responsive to the first and the second X-ray machine identifying information means for storing X-ray machine identifying information in the digital storage of the CPU 11a. The semi-automatic mode of operation provides that the second patient identifying information determining means further determines that X-ray machine identifying information will be present in data signals from the serial communication ports 33 or 35. A more detailed description of the software operation of the system 10 will now be described.

When the software boots, the system 10 displays a title page on the user LCD 14. The contents of the title page appear as follows:

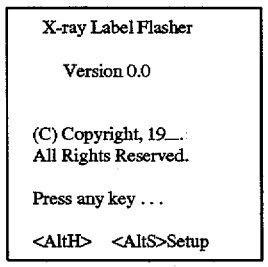

After booting, the system 10 waits for inputs the two serial ports 33, 35. In the absence of an input on either port, the system 10 operates in the stand-alone mode. If the system 10 receives data in a "PC" data format, the system 10 operates via the computer interface port 35 in the PC mode which conforms to a personal computer data protocol. On the other hand, if the system receives data in an "Alpha-RT data format", the system shall operate via the X-ray interface 33 in the Alpha-RT mode. The protocol for the "Alpha-RT data format" is an Instrumentarium protocol corresponding to data from Instrumentarium Alpha-lll and Alpha-RT X-ray machines.

As described in the flow diagram 200 of FIG. 17, depressing the Alt and S keys simultaneously will cause the system 10 to enter the setup mode 205. Setup mode 205 may be entered at any time except while making an X-ray exposure. Depressing the Alt and H keys simultaneously will cause the system 10 to enter help 204. Help may be entered at any time. Pressing any other key will cause the system to enter one of the three operational modes.

Setup mode is used to enter the institution name, and to set the internal real time clock (time of day and date).

Upon entering setup mode 205 the system 10 displays the following screen.

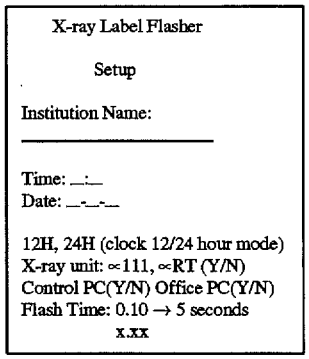

Where the above fields are as follows:
　　Institution Name:is the institution name edit field.
　　Time: is the present time of day edit field. This field is continuously updated as long as the system 10 in the setup mode 205.
　　Date: is the present date edit field.
　　In the setup mode the user may edit the institution name, the time of day and the date. One jumps from one edit field to another by depressing the enter key. When all edit fields have been satisfactorily edited they are saved by simultaneously depressing the Alt and S keys.

The user scrolls through the film types by depressing the TAB key. The system 10 includes as many types of films as are currently available on the market. The film's exposure time is stored internally in a look up table. The user selects a film type by pressing the enter key when the film type is scrolled into view. The system 10 then displays the setup shown above.

The system 10 returns to the mode it was in prior to entering setup mode when Alt and E are depressed. If any of the data were changed prior to selecting exit without saving the changes the user is prompted with the following screen.

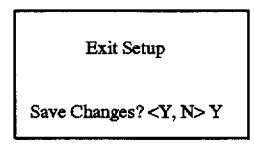

If the user selects "Y" the changes are saved. If the user selects "N" the changes are ignored.

In the stand-alone operation mode 207, the user is allowed to enter and edit patient data on a full screen editor as shown.

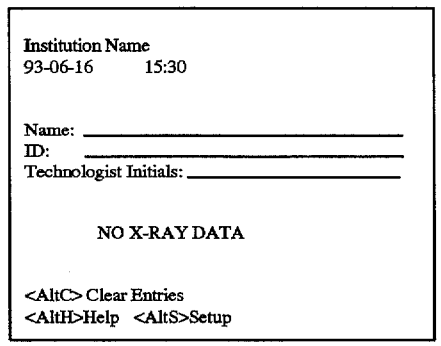

The fields of the stand-alone edit screen are as follows.
　　Institution Name:is the name of the institution.

e.g., 93-06-16:is the date field.

e.g., 15:30:is the time of day field.

Name: is the patient's name edit field. If the number of characters in the name is more than 18 characters the edit field shall scroll to the left to make the last two characters visible.

ID: is the patient's ID edit field. If the number of characters in the ID is more than 18 characters the edit field shall scroll to the left to make the last two characters visible.

Technologist's are the technologist's initials edit

Initials: field.

<AltC>Clear:

is an identifier showing that to clear the name and ID edit boxes one must depress the Alt and C keys. The user is first prompted before clearing the two edit fields.

<AltH>Help:

is an identifier showing that to see on screen help one must depress the Alt and H keys.

<AltS>Setup:

is an identifier showing that to set up the system one must depress the Alt and S keys.

If a previous patient name, ID or technologist's initials have been entered, they are displayed on the screen and remain displayed until <AltC>Clear is depressed. One jumps through the three edit fields by depressing the enter key. To clear all three patient and technologist data fields the user depresses the Alt and C keys. The user is prompted prior to clearing the fields with the screen shown below.

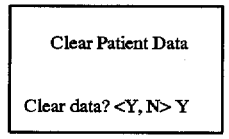

If the user selects "Y" the patient data is cleared. If the user selects "N" the patient data is not cleared. If the user selects enter the patient data is cleared. When the user wishes to expose a label on film cassette 18, the cassette 18 is loaded into the slot 16 and the cassette lever or handle 17 is depressed. Upon depressing the cassette handle 17, the below screen shown is displayed until the film has been exposed. The X-ray data is cleared upon completion or the exposure.

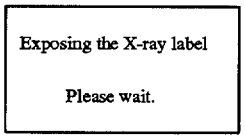

If the film cassette handle 17 is opened prior to completing the exposure the following error message is displayed.

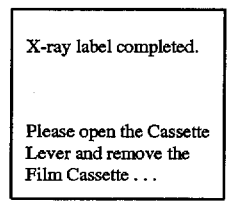

When the exposure is completed the following screen is displayed.

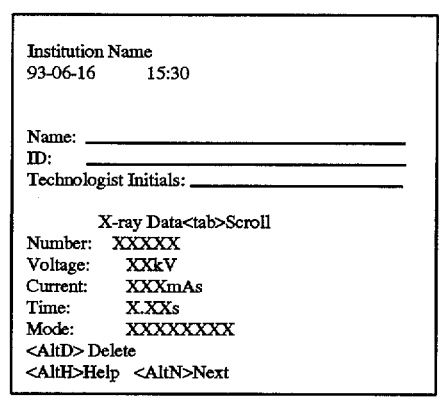

The system 10 pauses until the user opens the film cassette handle 17 to remove the cassette 18. Upon opening the lever the system returns to display the edit screen shown above. The patient's name, ID and technologist's initials entered earlier will be displayed on the screen. The user may edit the items or continue to expose more film cassettes by repeating the above procedure.

If the system 10 receives either Alpha-RT data or External PC data at any time during the stand-alone operation mode the system automatically switches to either one or the other of the input modes.

Upon receiving "Alpha-RT" formatted data the system 10 enters the ALPHA-RT mode according to the semiautomatic mode 208 or full-automatic mode 209 as described above. If the system 10 is currently exposing an X-ray label while the data is being received, it completes the exposure first before entering the new mode. The following screen is displayed.

The fields of the Alpha-RT Mode Edit Screen include the same fields as described above and further added fields as follows.

X-ray Data:

is an identifier showing that the following list of data is the X-ray data for the next exposure.

<TAB>Scroll:

is an identifier showing that X-ray data list can be scrolled by depressing the TAB key. In the embodiment, only five of the X-ray data fields are shown on the display at one time. Thus to see additional entries one must scroll through the list by depressing the TAB key.

X-ray data fields:
  Number: Exposure Number.
  Voltage: Voltage in Kv.
  Current: Current in MAs.
  Time: Exposure time in seconds.
  Mode: Exposure modes.
  Technique: Techniques.
  Angle: C-Arm Angle.
  Thickness: Breast thickness in cm.
  Force: Compression force in kg.
  Filter: The filter type.
  Dose: X-ray dose in mGy.
<AltD>Delete: is an identifier showing that the current X-ray exposure data can be deleted by depressing the Alt and D keys. The user is first prompted before deleting the X-ray exposure data.
<AltN>Next:
  is an identifier showing that there are more X-ray exposures in the buffer and that by depressing Alt N one can view the additional exposures. If there are no other exposures other than the current exposure the <AltN>Next is not displayed.

The user is allowed to edit the patient's name, patient ID and technologist's initials. To change the institution name or time or date, the user must enter setup by depressing <AltS>. To jump between the three edit fields one depresses the enter key. To delete the X-ray exposure data (abort printing of the X-ray label) one depresses the Alt and D keys. The user is first prompted whether or not the X-ray data should be deleted by the screen shown.

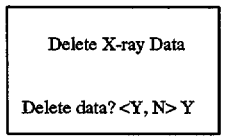

If the user selects "Y" the X-ray data is deleted. If the user selects "N" the X-ray data is not deleted.

To clear the patient name, ID and technologist's initials one depresses the Alt and C key. The user is first prompted whether or not the patient and technologist data should be cleared by displaying the message screen shown above.

If there are additional X-ray exposures stored in the internal buffer (up to 16), the <AltN>Next message is displayed. This message is not displayed if there are no additional exposures. Simultaneously depressing the Alt and N keys displays the next exposure field. A user may use this feature if multiple X-ray exposures have been made without adding a label to the cassettes 18 after each exposure. The user must, however, be certain to maintain the film cassettes 18 in the proper order to ensure that the correct label is made on each cassette 18.

When the user is ready to expose the X-ray film in the Alpha-RT mode, he inserts the cassette 18 into the slot 16 and depresses the cassette locking handle 17. The screens and procedures for exposing the X-ray label in the Alpha-RT mode are identical to the procedures for the stand-alone mode discussed above.

After the X-ray label is exposed, the current X-ray exposure data is removed from the buffer. If there is more exposure data in the buffer, the system 10 displays the remaining exposure data. If there is no more exposure data in the buffer, the system 10 jumps to the stand-alone mode 207.

As previously discussed, upon receiving "PC" formatted data on port 35 the system 10 enters the PC mode for semi-automatic mode 207 or automatic mode 209. If the system 10 is currently exposing an X-ray label while the PC data is being received, it completes the exposure first before entering the new mode.

The user may not edit any of the data fields while in the PC mode. (The data fields are edited using the PC.) The user may scroll through the X-ray data fields by depressing the TAB key. To delete the X-ray exposure data (not print or abort the X-ray label) the user depresses the Alt and D keys. However, as described above, the user is first prompted whether or not the X-ray data should be deleted.

If there are additional X-ray exposures stored in the internal buffer (up to 16), the <AltN>Next message is displayed. This message is not displayed if there are no additional exposures. Simultaneously depressing the Alt and N keys displays the next exposure field. A user may use this feature if multiple X-ray exposures have been made without adding a label to the cassettes 18 after each exposure. The user must, however, be certain to maintain the film cassettes 18 in the proper order to ensure that the correct label is made on each cassette 18.

When the user is ready to expose the X-ray film in the PC mode, the cassette 18 is inserted into the slot 16 and the cassette locking handle 17 is depressed. The screens and procedures for exposing the X-ray label in the PC mode are identical to the procedures for the stand-alone mode discussed above. After the X-ray label is exposed the current X-ray exposure data is removed from the buffer. If there is more exposure data in the buffer the system displays the next exposure. If there is no more exposure data in the buffer, the system jumps to the stand-alone mode 207.

In the event that the system 10 receives data errors through either serial port while inputting data from remote computer apparatus (e.g., either the PC or from the Alpha-RT), the following screen is displayed.

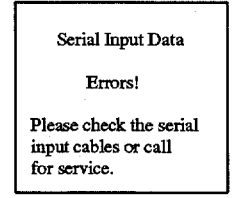

Where, <AltH>Help is an identifier showing that to see on screen help one must depress the Alt and H keys, and <AltE>Exit is an identifier showing that to continue one must depress the Alt and E keys.

Upon depressing the Alt and E keys, the system 10 enters the stand-alone mode 207 until it receives error free data in either the Alpha-RT or PC modes.

Figure 18:
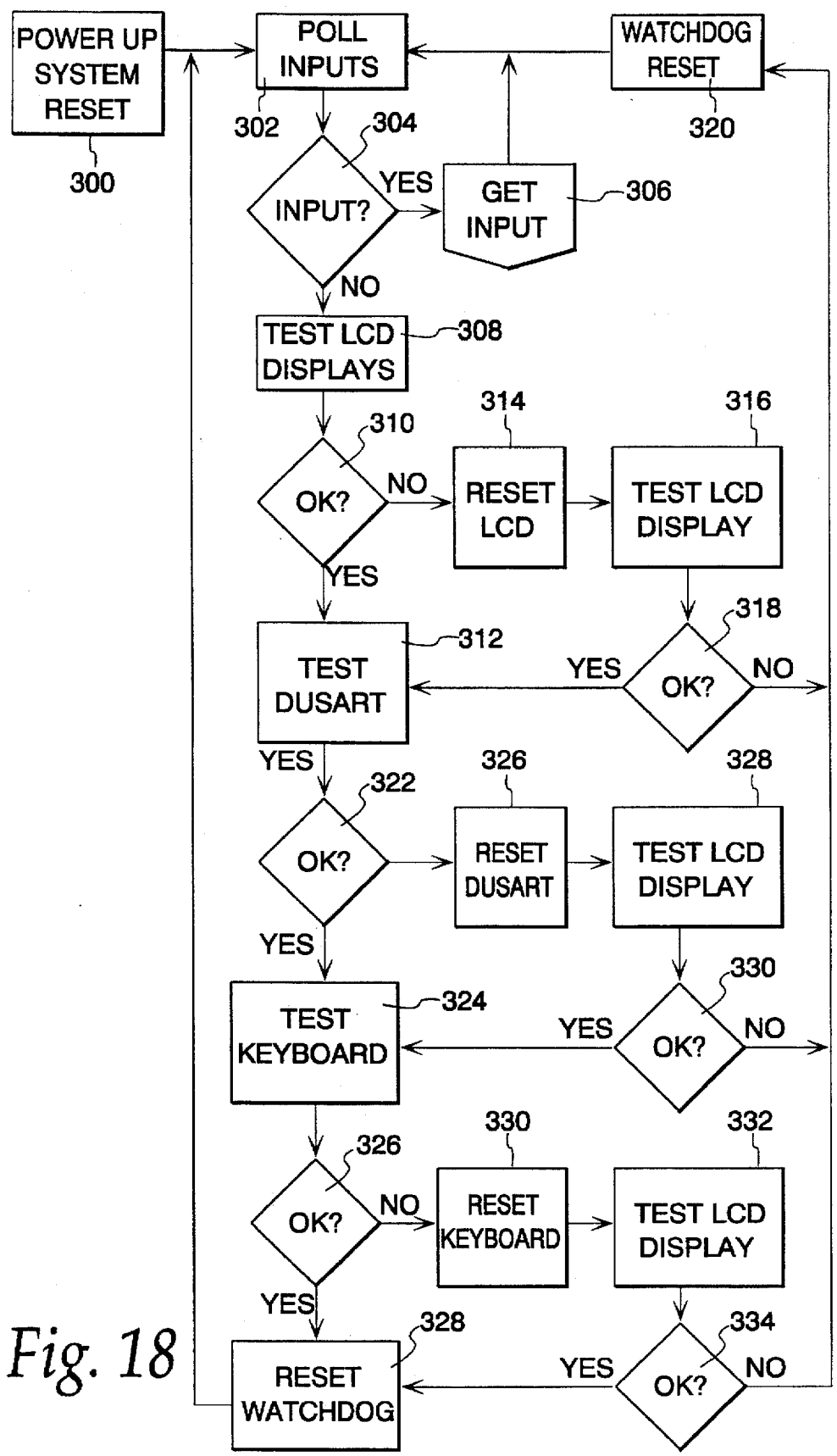
FIG. 18 is a flow chart describing the power-up and testing features including testing of the LCD display and watchdog reset.

Upon power up or system reset, as shown in FIG. 18 in a step 300, the inputs are polled in a step 302 and are tested in a step 304. When the inputs are being received, they are obtained in a get input step 306 which then transfers control back to the input polling step 302 via a loop. When there is no input power up polling the LCD displays are tested in a step 308. If they test functional in a step 310, the DUSART then is tested in a step 312. If they are not functional, the LCDs are reset in a step 314 and the LCD displays then are tested in a step 316. In a step 318, if the LCD display tests functional, control is passed to step 312. If not, control is transferred to a watchdog reset step 320 which then transfers control back to the input polling step 302. If the DUSART tests functional in a step 322, control is transferred to test the keyboard in a step 324. If the DUSART does not test functional, control is transferred to a step 326 in which the DUSART is reset followed by a test of the LCD displays in a step 328. If the LCD displays test non-functional in a step 330, control is transferred to the watchdog reset step 302. If the LCDs test functional, control is transferred to the test keyboard step 324.

In a step 326, if the keyboard tests functional, control is transferred to a reset watchdog step 328 which then transfers control back to the input polling step 302. If the keyboard is not functioning correctly, step 326 transfers control to a step 330 in which the keyboard is reset, followed by a step 332 in which the LCD displays are tested. If the LCD displays do not test functional in a step 334, control is transferred back to the watchdog reset step 302. If the LCD displays are functional, control is transferred to the step 328.

Figure 19:
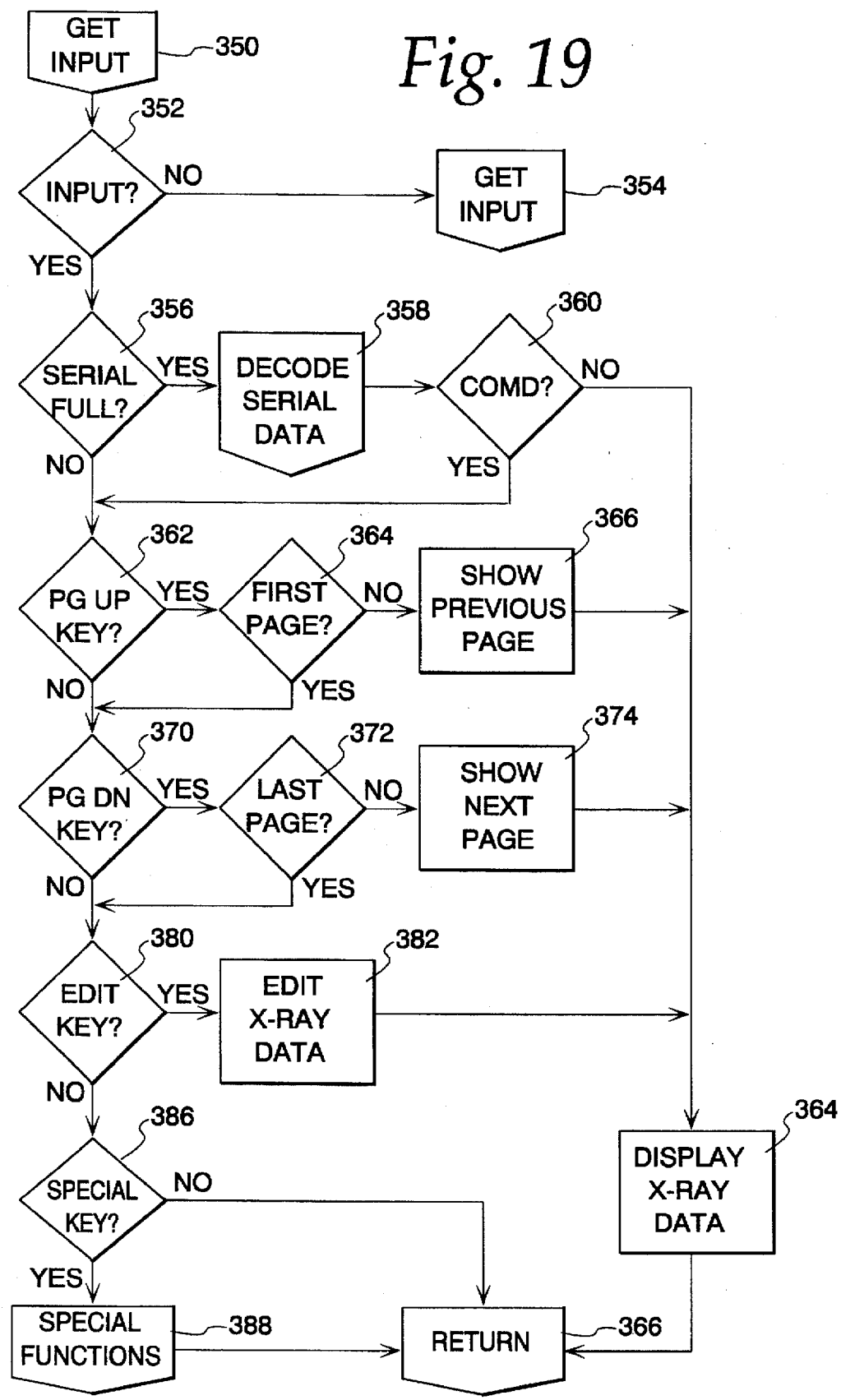
FIG. 19 is a flow chart showing the steps of a scrolling feature for scrolling patient data passed the display.

In order to provide a display paging function for the user LCD display, the processor can execute a step 350 to get input which is tested for in step 352, as shown in FIG. 19. If input is not present, then in a step 354 the processor returns to other routines. If there is input, a test is made in a step 356 to determine whether a serial buffer is full. If the serial buffer is full, then the serial data is decoded in a step 358 and a test is made in a step 360 to determine whether the serial data, in fact, is command data. If it is not, control is transferred to a step 362 which tests for a page up key. If the serial data indicates that a command was issued, then control is transferred to a step 364 in which an X-ray page is displayed on the user LCD display following which display control is transferred back to a return step 366. In the event that a page up key has been pressed, as tested for in step 362, a test is made in step 364 to determine whether it is for the first page. If it is not, the previous page is displayed in a step 366 following which the display step 364 is executed. In the event that a page up key is not indicated by step 362, control is transferred to a step 370 which tests for whether the serial data indicates that the page down key has been pressed. If it has, control is transferred to a step 372 testing for whether it is the last page or not. If it is not, control is transferred to step 374 indicating that the next page is to be shown following which the X-ray page is displayed in the step 364. If either the page down key is not indicated in the step 370, or a last page is indicated in the step 372, control is transferred to a step 380 which tests the serial data to determine whether the edit key has been pressed. If it has, control is transferred to the step 382 to edit the X-ray data following which the X-ray is displayed in the step 364. If it is not, control is transferred to the step 386 testing for a special key. If a special key has been depressed, control is transferred to a special functions routine in a step 388. If not, the return step 366 is executed.

Figure 20:
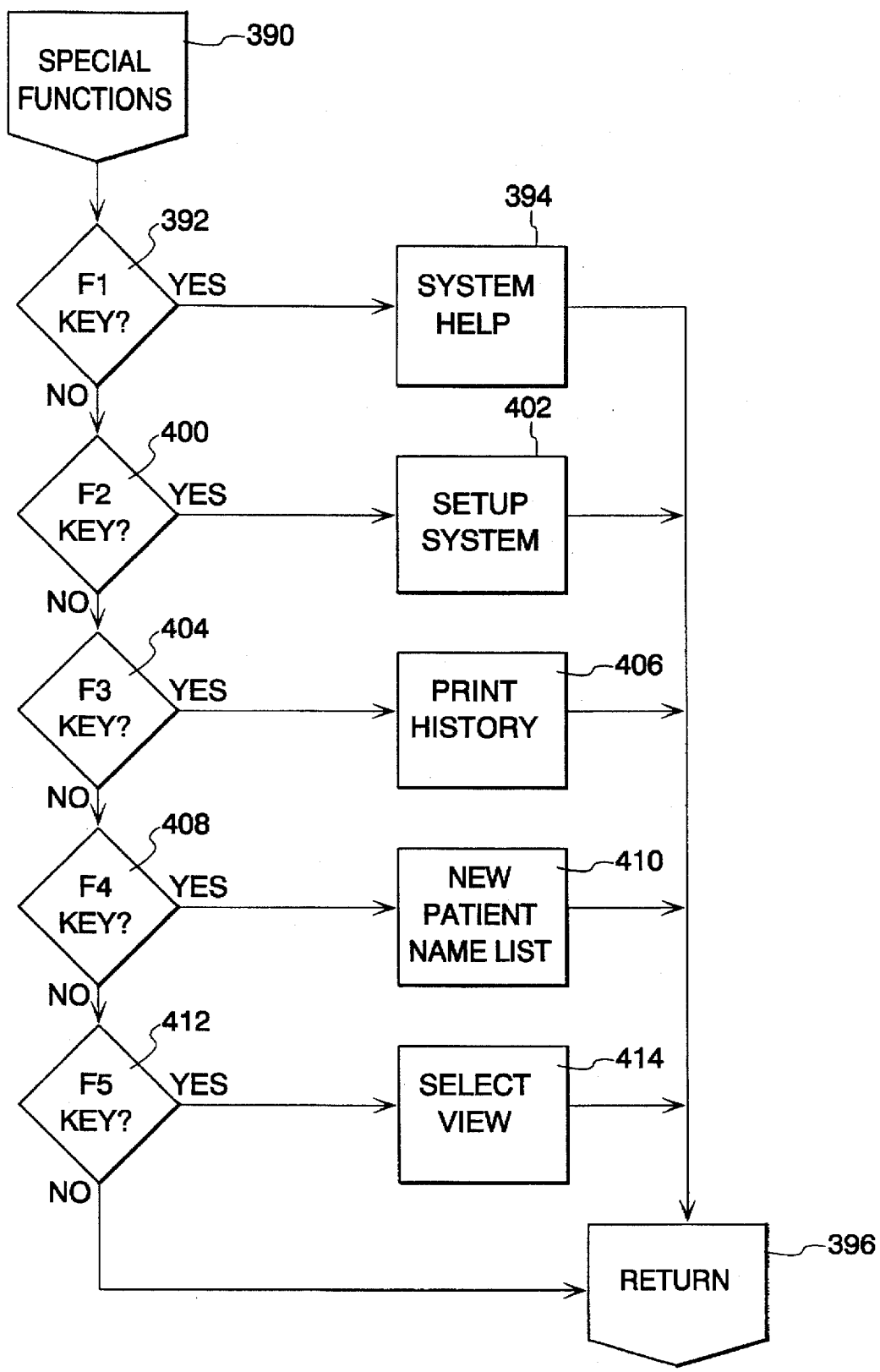
FIG. 20 is a flow chart showing a display feature allowing various information to be called up via special function keys.

The transfer to the special function routines from step 388 is entered via a step 390, as shown in FIG. 20. A test is made in the step 392 to determine whether the F1 key has been depressed. If it has, system help is then provided to the user in the step 394 following which control is transferred to a return in the step 396. A step 400 tests for depression of the F2 key. If it has been depressed, the system set up routines are entered in the step 402. Otherwise, the F3 key is tested in the step 404. If the F3 key has been depressed, a history is printed out in a step 406. If the F3 key was not depressed, control is transferred to a test F4 key step 408 which, if positive, causes a new patient name list to be provided in a step 410. If the F4 key has not been depressed, control is transferred to test for the depression of the F5 key in a step 412. If F5 has been depressed, a view is selected in a step 414.

Figure 21:
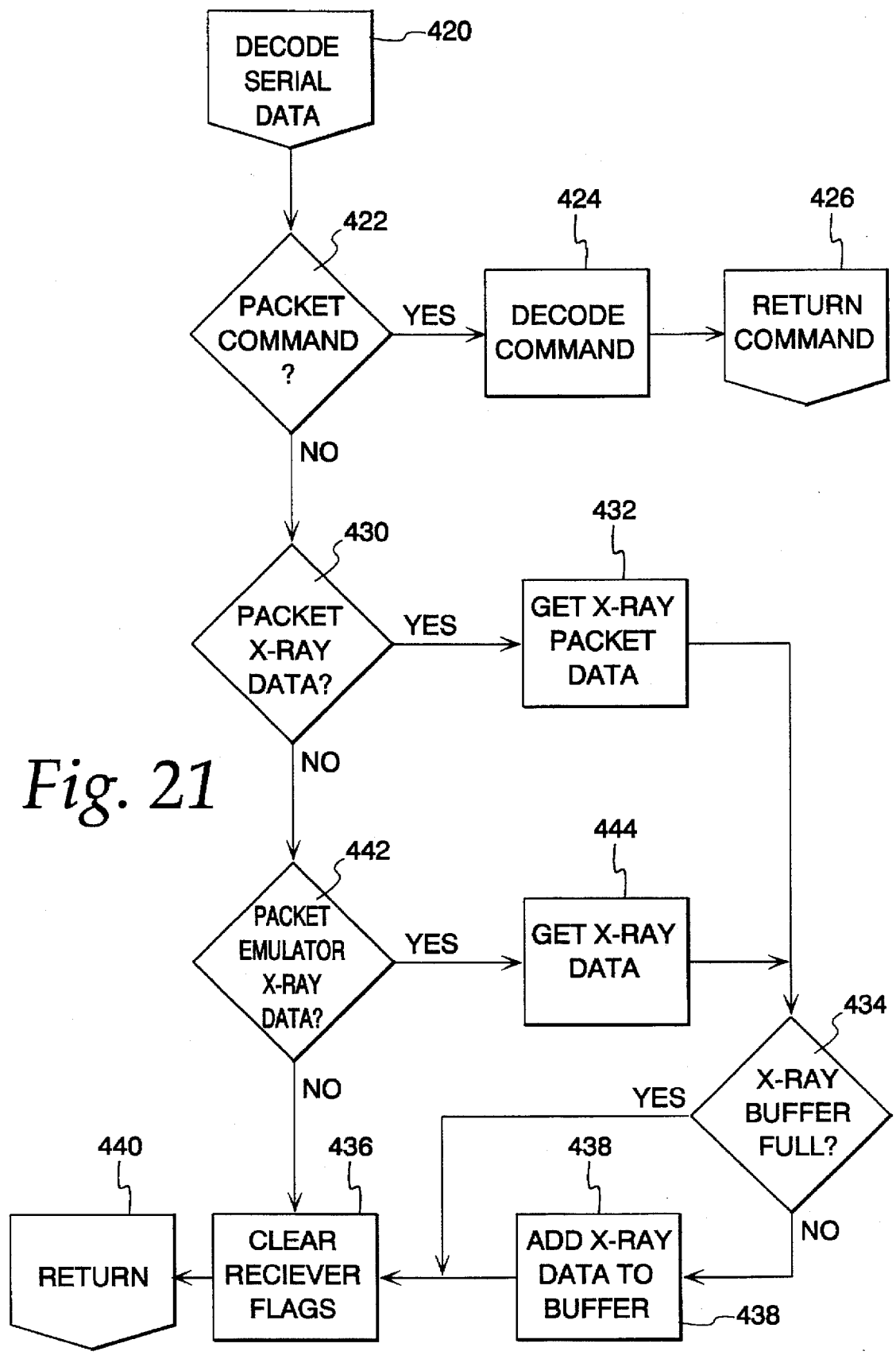
FIG. 21 is a flow chart showing execution of a series of steps for obtaining X-ray data from an external source such as an X-ray machine.

Serial data received from another X-ray machine is decoded in a step 420, as shown in FIG. 21. A test is made in a step 422 to determine whether a packet command has been issued. If it has, control is transferred to a step 424 causing the command to be decoded and the command is returned to the main processing routine in a step 426. If the packet command test 422 indicates that the packet command was not received, control is transferred to a step 430 which tests for the receipt of packet X-ray data. If packet X-ray data has been received, control is transferred to a step 432 to get the packet X-ray data and place it in an X-ray buffer. A test is made in a step 434 to determine whether the X-ray data buffer has filled. If the X-ray data buffer has filled, control is transferred to a step 436 indicating that receiver flags are to be cleared. If the X-ray data buffer has not been filled, the X-ray data is added to the X-ray data buffer in a step 438 following which the receiver flags are also cleared in the step 436 and the routine is exited in a step 440. In the event that the test of step 430 indicates that the packet does not contain X-ray data, control is transferred to a step 442 to test whether the packet contains printer emulator X-ray data. If it is, control is then transferred to a step 444 to get the X-ray data which is then loaded in steps 434 and 438 into the X-ray buffer. In the event that the data is not printer emulator X-ray data, control is transferred to the step 436 to clear the receiver flags.

There having been described an embodiment of the present invention, other embodiments will be apparent to those skilled in the art from consideration of the specification and practice of the invention disclosed herein. It is intended that the specification be considered as exemplary only with a true scope and spirit of the invention being indicated by the following claims:

What is claimed is:

1. A system for optically marking a latent image of printed data on X-ray film for chest or mammography contained in a closed cassette comprising:

means for receiving the X-ray film cassette holding X-ray film therein;

means for opening an optical path from outside the cassette to provide access to the X-ray film to allow a latent image to be formed thereon and for closing the optical path thereafter;

means for establishing an optical path from outside the X-ray film cassette to said X-ray film;

means for generating a plurality of data fields by allowing an operator to scroll through stored data field selections, select a data selection and cause a data selection signal to be transmitted; and optical character generator means coupled to said data scrolling means receiving said data selection signal for generating an image of said selected data field on said X-ray film to form a latent image thereof on said X-ray film.

2. A system for optically marking a latent image of printed data on X-ray film for chest or mammography contained in a closed cassette comprising:

means for receiving an X-ray film cassette holding X-ray film therein;

means for opening an optical path from outside the X-ray film cassette to said X-ray film and for closing the optical path after optically marking a latent image on the X-ray film;

means for generating a plurality of data fields by allowing an operator to scroll through data selections to be supplied to said data fields, select a data selection and cause a data selection signal to be transmitted;

an LCD optical character generator means coupled to said data scrolling means to receive said data selection signal and for generating an image of said selected data on said X-ray film to form a latent image thereof on said X-ray film;

means for storing a plurality of patient identification information; and means for scrolling through said patient identification information that has previously been prescheduled in order to match a patient with his or her patient identification information at the time an X-ray is being taken.

3. A system for marking printed data on X-ray film comprising:

means for receiving an X-ray film cassette;

means for generating a data field;

means for periodically checking said data field generating means for errors;

means coupled to said data means for generating an optical character pattern for exposing said X-ray film to form a latent image of said data thereon; said means for periodically checking said data field generating means for errors periodically includes means for testing the keyboard, a display and input/output devices for soft errors and for resetting said devices on the detection of said soft errors.

4. A system for marking printed data on X-ray film for chest or mammography contained in a closed cassette comprising:

means for receiving an X-ray film cassette;

means for opening an optical path from outside the cassette to provide access to the X-ray film to allow a latent image to be formed thereon and for closing the optical path thereafter;

means for generating data reflective of an X-ray machine state and a patient state;

means for receiving X-ray machine customization data;

means for receiving clinical customization data;

an LCD means;

means for generating a plurality of optical characters on the LCD means in response to said data fields; and forming said optical characters on said X-ray film from the characters generated by the LCD means.

5. A system for marking printed data on X-ray film for chest or mammography contained in a closed cassette comprising:

means for receiving an X-ray film cassette;

means for opening an optical path from outside the cassette to provide access to the X-ray film to allow a latent image to be formed thereon and for closing the optical path thereafter;

means for generating data reflective of a machine state and a patient state;

means for receiving X-ray machine customization data;

means for receiving clinical customization data;

an LCD means;

means for generating a plurality of optical characters in response to said data fields and for operating the LCD means for forming said optical characters on said X-ray film; and means for generating characters reflective of the patient's name in a visually enhanced form with respect to other characters.

* * * * *